INVENTOR
J. H. FELKER
BY
Sn Turner
ATTORNEY

April 26, 1960 J. H. FELKER 2,934,268
SQUARE ROOT COMPUTER
Filed May 28, 1956 7 Sheets-Sheet 2

INVENTOR
J. H. FELKER
BY Sn Turner
ATTORNEY

CONVERGING SWITCH UNIT

INVENTOR
J. H. FELKER
BY [signature]
ATTORNEY

ADDER BLOCK DIAGRAM

BLOCK DIAGRAM OF ACCUMULATOR

INVENTOR
J. H. FELKER
BY
[signature]
ATTORNEY

April 26, 1960 — J. H. FELKER — 2,934,268

SQUARE ROOT COMPUTER

Filed May 28, 1956 — 7 Sheets-Sheet 5

OUTLINE OF SQUARE ROOT PROCESS

INVENTOR
J. H. FELKER
BY
[signature]
ATTORNEY

April 26, 1960 J. H. FELKER 2,934,268

SQUARE ROOT COMPUTER

Filed May 28, 1956 7 Sheets-Sheet 6

SQUARE ROOTER BLOCK DIAGRAM

INVENTOR
J. H. FELKER
BY
[signature]
ATTORNEY

FIG. 11

DETAILS OF SQUARE ROOT PROCESS

CONDUCTOR NUMBERS OF FIG. 10 — SWITCH OF FIG. 10

| DIGIT TIME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 1 | 2 | 3 |
|---|---|---|---|---|---|---|---|---|---|---|---|---|---|---|---|---|---|---|---|---|---|---|---|---|---|---|---|---|---|---|---|---|---|---|---|---|
| 1 | 1 | 0 | 0 | 0 | 0 | 1 | 1 | 1 | 1 | 1 | 0 | 0 | 0 | 1 | 1 | 0 | 0 | 1 | 0 | 0 | 0 | 0 | 0 | 0 | 0 | 0 | 0 | 0 | 0 | 0 | 0 | 0 | 0 | a | a | a |
| 2 | 0 | 0 | 0 | 0 | 0 | 0 | 1 | 0 | 0 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 3 | 0 | 0 | 0 | 0 | 0 | 0 | 1 | 0 | 0 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 4 | 0 | 0 | 0 | 0 | 0 | 0 | 1 | 0 | 0 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 5 | 0 | 0 | 0 | 0 | 0 | 1 | 1 | 1 | 1 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 6 | 0 | 0 | 0 | 0 | 0 | 1 | 1 | 1 | 1 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 7 | 0 | 0 | 0 | 0 | 0 | 1 | 1 | 1 | 1 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 8 | 0 | 0 | 0 | 0 | 0 | 0 | 1 | 0 | 0 | 1 | 0 | 0 | 0 | 0 | 1 | 0 | 0 | 1 | 0 | 0 | 0 | 0 | 0 | 0 | 0 | 0 | 0 | 0 | 0 | 0 | 0 | 0 | 0 | a | a | a |
| 9 | 0 | 0 | 0 | 1 | 0 | 0 | 1 | 0 | 1 | 1 | 0 | 0 | 0 | 0 | 0 | 0 | 1 | 0 | 1 | 0 | 0 | 0 | 0 | 0 | 0 | 0 | 0 | 1 | 0 | 0 | 0 | 0 | 0 | a | a | a |
| 10 | 0 | 1 | 0 | 0 | 0 | 1 | 1 | 1 | 0 | 0 | 1 | 0 | 0 | 0 | 0 | 0 | 0 | 1 | 1 | 1 | 0 | 0 | 0 | 1 | 0 | 0 | 0 | 0 | 0 | 0 | 0 | 0 | 0 | a | a | a |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 1 | 2 | 3 |
| 11 | 0 | 0 | 1 | 0 | 1 | 0 | 1 | 1 | 1 | 1 | 0 | 1 | 1 | 1 | 1 | 0 | 0 | 1 | 0 | 0 | 0 | 1 | 1 | 1 | 0 | 0 | 1 | 0 | 0 | 0 | 0 | 0 | 0 | b | a | a |
| 12 | 0 | 0 | 0 | 0 | 0 | 0 | 1 | 0 | 0 | 1 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | a |
| 13 | 0 | 0 | 0 | 0 | 0 | 0 | 1 | 0 | 1 | 0 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | a |
| 14 | 0 | 0 | 0 | 0 | 0 | 0 | 1 | 0 | 0 | 1 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | a |
| 15 | 0 | 0 | 0 | 0 | 0 | 0 | 1 | 1 | 1 | 1 | 0 | 0 | 0 | 0 | 1 | 0 | 0 | 1 | 0 | 0 | 0 | 1 | 1 | 1 | 0 | 0 | 1 | 0 | 0 | 0 | 0 | 0 | 0 | b | a | a |
| 16 | 0 | 0 | 0 | 0 | 0 | 0 | 1 | 1 | 1 | 1 | 0 | 0 | 0 | 0 | 1 | 0 | 0 | 1 | 0 | 0 | 0 | 1 | 1 | 1 | 0 | 0 | 1 | 0 | 0 | 0 | 0 | 0 | 0 | b | a | a |
| 17 | 0 | 0 | 0 | 1 | 0 | 0 | 1 | 1 | 0 | 1 | 0 | 0 | 0 | 0 | 0 | 0 | 1 | 0 | 1 | 0 | 0 | 1 | 1 | 1 | 0 | 0 | 1 | 1 | 0 | 0 | 0 | 0 | 0 | b | a | a |
| 18 | 0 | 0 | 0 | 0 | 0 | 0 | 1 | 0 | 0 | 1 | 0 | 0 | 0 | 0 | 1 | 0 | 0 | 1 | 1 | 1 | 0 | 1 | 1 | 1 | 0 | 0 | 0 | 0 | 0 | 0 | 0 | 0 | 0 | b | a | a |
| 19 | 0 | 0 | 0 | 0 | 1 | 0 | 1 | 1 | 0 | 1 | 0 | 0 | 0 | 0 | 0 | 1 | 1 | 0 | 1 | 0 | 1 | 1 | 1 | 1 | 1 | 0 | 1 | 0 | 1 | 0 | 0 | 0 | 1 | b | a | a |
| 20 | 0 | 1 | 0 | 0 | 0 | 0 | 1 | 0 | 0 | 1 | 1 | 0 | 0 | 0 | 1 | 0 | 0 | 1 | 0 | 0 | 0 | 1 | 0 | 1 | 0 | 0 | 0 | 0 | 0 | 0 | 0 | 0 | 0 | b | a | a |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 1 | 2 | 3 |
| 21 | 0 | 0 | 1 | 0 | 0 | 0 | 1 | 1 | 1 | 1 | 0 | 1 | 1 | 1 | 1 | 0 | 0 | 1 | 0 | 0 | 0 | 1 | 1 | 1 | 0 | 0 | 1 | 0 | 0 | 1 | 0 | 0 | 0 | b | a | a |
| 22 | 0 | 0 | 0 | 0 | 0 | 0 | 1 | 0 | 0 | 1 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | a |
| 23 | 0 | 0 | 0 | 0 | 0 | 0 | 1 | 0 | 0 | 1 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | a |
| 24 | 0 | 0 | 0 | 0 | 0 | 0 | 1 | 0 | 0 | 1 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | a |
| 25 | 0 | 0 | 0 | 1 | 0 | 0 | 1 | 1 | 0 | 1 | 0 | 0 | 0 | 0 | 0 | 0 | 1 | 0 | 1 | 0 | 0 | 1 | 1 | 1 | 0 | 0 | 1 | 1 | 0 | 0 | 0 | 0 | 0 | b | a | a |
| 26 | 0 | 0 | 0 | 0 | 0 | 0 | 1 | 1 | 1 | 1 | 0 | 0 | 0 | 0 | 1 | 0 | 0 | 1 | 1 | 1 | 0 | 1 | 1 | 1 | 0 | 0 | 1 | 0 | 0 | 0 | 0 | 0 | 0 | b | a | a |
| 27 | 0 | 0 | 0 | 0 | 1 | 0 | 1 | 0 | 1 | 1 | 0 | 0 | 0 | 0 | 0 | 1 | 1 | 0 | 1 | 0 | 1 | 1 | 1 | 1 | 1 | 0 | 0 | 0 | 0 | 0 | 0 | 0 | 1 | b | a | a |
| 28 | 0 | 0 | 0 | 0 | 0 | 0 | 1 | 0 | 0 | 0 | 0 | 0 | 0 | 0 | 0 | 1 | 1 | 0 | 1 | 0 | 0 | 1 | 1 | 1 | 0 | 1 | 0 | 0 | 0 | 0 | 0 | 0 | 1 | b | a | a |
| 29 | 0 | 0 | 0 | 0 | 0 | 0 | 1 | 0 | 1 | 0 | 0 | 0 | 0 | 0 | 1 | 0 | 0 | 1 | 0 | 0 | 0 | 1 | 1 | 1 | 0 | 0 | 0 | 0 | 1 | 0 | 0 | 0 | 0 | b | a | a |
| 30 | 0 | 1 | 0 | 0 | 0 | 0 | 1 | 0 | 1 | 0 | 0 | 0 | 0 | 0 | 1 | 0 | 0 | 1 | 0 | 0 | 0 | 1 | 0 | 0 | 0 | 0 | 0 | 0 | 0 | 0 | 0 | 0 | 0 | b | a | a |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 1 | 2 | 3 |
| 31 | 0 | 0 | 1 | 0 | 0 | 0 | 1 | 1 | 1 | 0 | 0 | 0 | 0 | 0 | 1 | 0 | 0 | 0 | 0 | 0 | 0 | 0 | 0 | 0 | 0 | 0 | 1 | 0 | 0 | 1 | 0 | 0 | 0 | b | b | a |
| 32 | 0 | 0 | 0 | 0 | 0 | 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | b | b | a |
| 33 | 0 | 0 | 0 | 1 | 0 | 0 | 1 | 0 | 1 | 0 | 0 | 0 | 0 | 0 | 0 | 0 | 1 | 1 | 1 | 0 | 0 | 0 | 0 | 0 | 0 | 0 | 0 | 1 | 0 | 0 | 0 | 0 | 0 | b | b | a |
| 34 | 0 | 0 | 0 | 0 | 0 | 0 | 1 | 0 | 1 | 0 | 0 | 0 | 0 | 0 | 1 | 0 | 0 | 1 | 1 | 1 | 0 | 0 | 0 | 0 | 0 | 0 | 0 | 0 | 0 | 0 | 0 | 0 | 0 | b | b | a |
| 35 | 0 | 0 | 0 | 0 | 1 | 0 | 1 | 0 | 0 | 0 | 0 | 0 | 0 | 0 | 1 | 0 | 0 | 0 | 0 | 0 | 1 | 0 | 0 | 0 | 0 | 0 | 0 | 0 | 0 | 0 | 0 | 0 | 0 | b | b | a |
| 36 | 0 | 0 | 0 | 0 | 0 | 0 | 1 | 1 | 0 | 0 | 0 | 0 | 0 | 0 | 0 | 1 | 1 | 1 | 1 | 0 | 0 | 0 | 0 | 0 | 0 | 1 | 1 | 0 | 0 | 0 | 0 | 0 | 1 | b | b | a |
| 37 | 0 | 0 | 0 | 0 | 0 | 0 | 1 | 1 | 1 | 1 | 0 | 0 | 0 | 0 | 0 | 1 | 1 | 1 | 1 | 0 | 0 | 0 | 0 | 0 | 0 | 1 | 1 | 0 | 0 | 0 | 0 | 0 | 1 | b | b | a |
| 38 | 0 | 0 | 0 | 0 | 0 | 0 | 1 | 0 | 1 | 1 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | b | b | a |
| 39 | 0 | 0 | 0 | 0 | 0 | 0 | 1 | 1 | 1 | 0 | 0 | 0 | 0 | 0 | 1 | 0 | 0 | 0 | 0 | 0 | 0 | 0 | 0 | 0 | 0 | 0 | 1 | 0 | 1 | 0 | 0 | 0 | 0 | b | b | a |
| 40 | 0 | 1 | 0 | 0 | 0 | 0 | 1 | 1 | 1 | 0 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | b | b | a |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 1 | 2 | 3 |
| 41 | 0 | 0 | 1 | 1 | 0 | 0 | 1 | 1 | 0 | 0 | 0 | 0 | 0 | 0 | 0 | 0 | 1 | 1 | 1 | 0 | 0 | 0 | 0 | 0 | 0 | 0 | 1 | 1 | 0 | 1 | 0 | 0 | 0 | b | b | a |
| 42 | 0 | 0 | 0 | 0 | 0 | 0 | 1 | 0 | 0 | 1 | 0 | 0 | 0 | 0 | 1 | 0 | 0 | 1 | 1 | 1 | 0 | 0 | 0 | 0 | 0 | 0 | 0 | 0 | 0 | 0 | 0 | 0 | 0 | b | b | a |
| 43 | 0 | 0 | 0 | 0 | 1 | 0 | 1 | 1 | 0 | 1 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 0 | b | b | a |
| 44 | 0 | 0 | 0 | 0 | 0 | 0 | 1 | 1 | 0 | 1 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | b | b | a |
| 45 | 0 | 0 | 0 | 0 | 0 | 0 | 1 | 0 | 0 | 1 | 0 | 0 | 0 | 0 | 0 | 1 | 1 | 1 | 1 | 0 | 0 | 0 | 0 | 0 | 0 | 1 | 0 | 0 | 0 | 0 | 0 | 0 | 1 | b | b | a |
| 46 | 0 | 0 | 0 | 0 | 0 | 0 | 1 | 0 | 0 | 1 | 0 | 0 | 0 | 0 | 0 | 1 | 1 | 1 | 1 | 0 | 0 | 0 | 0 | 0 | 0 | 1 | 0 | 0 | 0 | 0 | 0 | 0 | 1 | b | b | a |
| 47 | 0 | 0 | 0 | 0 | 0 | 0 | 1 | 1 | 0 | 1 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | b | b | a |
| 48 | 0 | 0 | 0 | 0 | 0 | 0 | 1 | 1 | 0 | 1 | 0 | 0 | 0 | 0 | 1 | 0 | 0 | 0 | 0 | 0 | 0 | 0 | 0 | 0 | 0 | 0 | 1 | 0 | 0 | 0 | 0 | 0 | 0 | b | b | a |
| 49 | 0 | 0 | 0 | 1 | 0 | 0 | 1 | 1 | 0 | 1 | 0 | 0 | 0 | 0 | 1 | 0 | 0 | 0 | 0 | 0 | 0 | 0 | 0 | 0 | 0 | 0 | 1 | 0 | 1 | 0 | 0 | 0 | 0 | b | b | a |
| 50 | 0 | 1 | 0 | 0 | 0 | 0 | 1 | 1 | 0 | 1 | 1 | 0 | 0 | 0 | 1 | 0 | 0 | 0 | 0 | 0 | 0 | 0 | 0 | 1 | 0 | 0 | 1 | 0 | 0 | 0 | 0 | 0 | 0 | b | b | a |
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 1 | 2 | 3 |
| 51 | 0 | 0 | 1 | 0 | 1 | 0 | 1 | 0 | 1 | 1 | 0 | 1 | 1 | 1 | 0 | 1 | 1 | 0 | 1 | 0 | 1 | 1 | 1 | 1 | 1 | 0 | 0 | 0 | 0 | 1 | 1 | 1 | 0 | b | a | b |
| 52 | 0 | 0 | 0 | 0 | 0 | 0 | 1 | 0 | 1 | 0 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | b |
| 53 | 0 | 0 | 0 | 0 | 0 | 0 | 1 | 0 | 1 | 0 | 0 | 0 | 0 | 0 | 1 | 0 | 0 | 1 | 0 | 0 | 0 | 1 | 1 | 1 | 0 | 0 | 0 | 0 | 0 | 0 | 0 | 0 | 0 | b | a | b |
| 54 | 0 | 0 | 0 | 0 | 0 | 0 | 1 | 0 | 0 | 0 | 0 | 0 | 0 | 0 | 0 | 1 | 1 | 0 | 1 | 0 | 0 | 1 | 1 | 1 | 0 | 1 | 0 | 0 | 0 | 0 | 0 | 1 | 0 | b | a | b |
| 55 | 0 | 0 | 0 | 0 | 0 | 0 | 1 | 0 | 0 | 0 | 0 | 0 | 0 | 0 | 0 | 1 | 1 | 0 | 1 | 0 | 0 | 1 | 1 | 1 | 0 | 1 | 0 | 0 | 0 | 0 | 0 | 1 | 0 | b | a | b |

INVENTOR J. H. FELKER

BY [signature]

ATTORNEY

United States Patent Office 2,934,268

Patented Apr. 26, 1960

2,934,268

SQUARE ROOT COMPUTER

Jean H. Felker, Livingston, N.J., assignor to Bell Telephone Laboratories, Incorporated, New York, N.Y., a corporation of New York Application May 28, 1956, Serial No. 587,568

16 Claims. (Cl. 235—158)

This is a continuation-in-part of my application Serial No. 258,448, filed November 27, 1951, for "Computer Circuit," and now abandoned.

This invention relates generally to computers and more particularly to digital computers of the variety known as serial binary computers.

More specifically, the invention disclosed and claimed hereinafter comprises a component of a computer, or the entire computer depending upon the scope of operations performed by same, herein referred to as a square rooter. The invention, as its name implies, is a computing means or machine for performing the process of extracting the square root of a number.

A serial computer is one which handles and performs computing functions on a time basis, as distinguished from a spatial basis. That is, the functioning of the computer is based upon timed pulses occurring at regular intervals of time where each pulse, in the binary system of arithmetic, designates a denominational or exponential order of a base, such, for instance, as the base 2 which is used as exemplary in subsequent discussion. Any particular number in the binary equivalent of the more common decimal system of notation is represented by a succession of pulses or absences of pulses spaced in time and indentifiable as digits. Each digit of the binary number represents, in a base 2 system, successive powers of 2 from 0 up to 4, if a five-digit system, or up to 5, if a six-digit system, etc., depending upon how high the exponents of the base 2 must go in order that the sum of all of such powers of 2 will equal the decimal number represented by the binary notation. The presence of a 1 in a digit place indicates the presence of one unit of that particular power of 2. The presence of a 0 in a digit place indicates the absence of a unit of that particular power of 2. The following table illustrates this relationship:

| $2^5$ | $2^4$ | $2^3$ | $2^2$ | $2^1$ | $2^0$ | |
|---|---|---|---|---|---|---|
| 1 | 0 | 0 | 1 | 1 | 0 | Binary Number=38 |
| 0 | 1 | 0 | 0 | 1 | 1 | Binary Number=19 |
| 1 | 0 | 1 | 0 | 1 | 0 | Binary Number=42 |

In serial binary computers the binary numbers appear a digit at a time spaced at regular intervals, such as every microsecond. Thus the above decimal number 38 will appear in the computer in the order of 0–1–1–0–0–1, representing pulses and absences of pulses spaced at regular intervals of time from left to right. Likewise the number 19 will appear as 1–1–0–0–1–0, the least significant digit appearing first.

It is believed that there has been no prior square rooter mechanized for high speed computation. The present invention mechanizes, by the use of circuits for handling accurately timed pulses, the arithmetic method of extracting a square root. What is believed to be a new and basic contribution to this art is such a computer circuit or machine including means for eliminating the necessity of making "trial guesses" in the arithmetic method.

As is well known, the arithmetic method of extracting a square root involves the making of successive trial guesses as to the proper value of answer digits. Such trial guesses are used to create successive subtrahends for subtraction initially from the number and subsequently from each successive remainder. If a negative remainder is produced it is necessary, in the usual manual arithmetic method, to erase the wrong trial guess and the negative remainder and the subtrahend and to repeat the step using a new lower order trial digit. For machine operation in a serial computer the actual retracting of such steps is not possible because by the time a negative remainder is detected the previous subtrahends and remainders have disappeared. The present invention eliminates the troubles associated with wrong trial guesses. The present invention makes an assumption that the answer digit being determined is a one but does not insert this digit 1 into the answer unless a positive remainder is detected. If a negative remainder is detected the machine writes a zero in the answer and then proceeds to form from the instant negative remainder a number equal to the new next proper remainder by adding a variable but controlled set of operator digits to the instant negative remainder. The digits of this operator set are determined by the significance in the answer of the digit associated with the negative remainder.

The purpose of the invention then is eliminating trial guess complications in the extraction of a square root and simplifying the operation of such a machine or computer.

A feature of the invention is the provision of means in a computer for mechanizing the arithmetic process of extracting a square root.

A specific feature of the invention is the provision of means in a square rooter for eliminating the complications born out of wrong trial guesses for answer digits made in the arithmetic process of extracting a square root.

Subsequent detailed description of an embodiment of the invention is based upon the drawings, of which the following are general descriptions of the various figures:

Fig. 11 is a table showing the exact pulse status of each conductor of Fig. 10 for each digit period of an assumed example.

The description to follow comprises two general sections. The first section, designated "General Description," describes the content of the basic units which are contained in the block diagrams of the square rooter and other parts of the computer. The second section, designated "Detailed Description of Square Rooter," is, as its name implies, reserved for a detailed discussion of the functioning of the square rooter.

GENERAL DESCRIPTION

Figure 7:
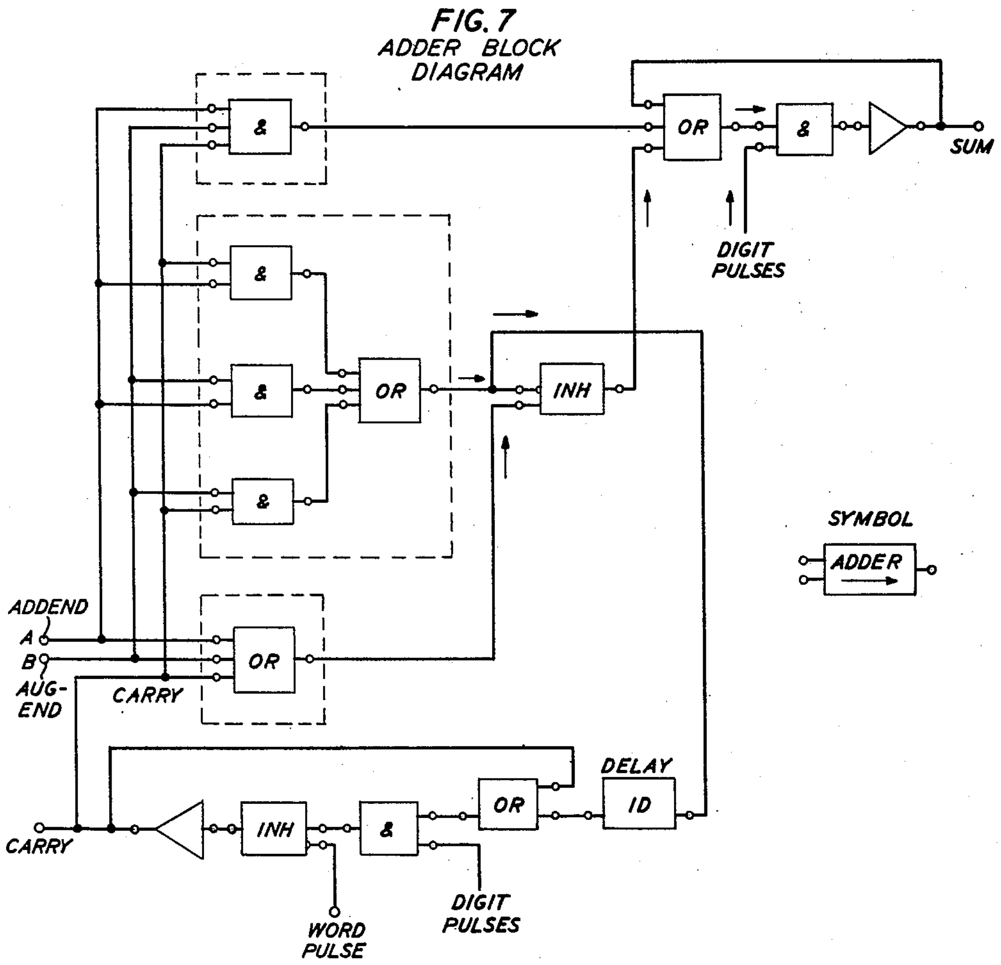
Fig. 7 is a block diagram of an adder and its symbol.
Figure 8:
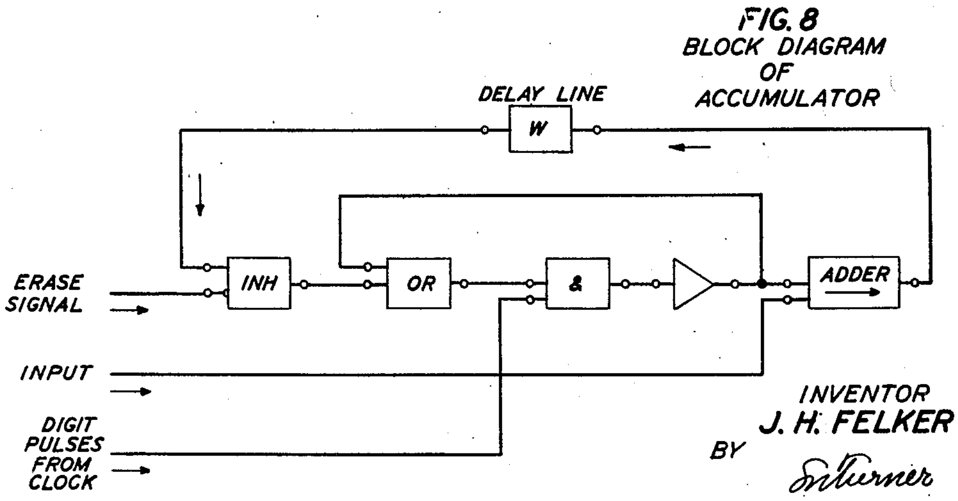
Fig. 8 is a block diagram of an accumulator.
Figure 9:
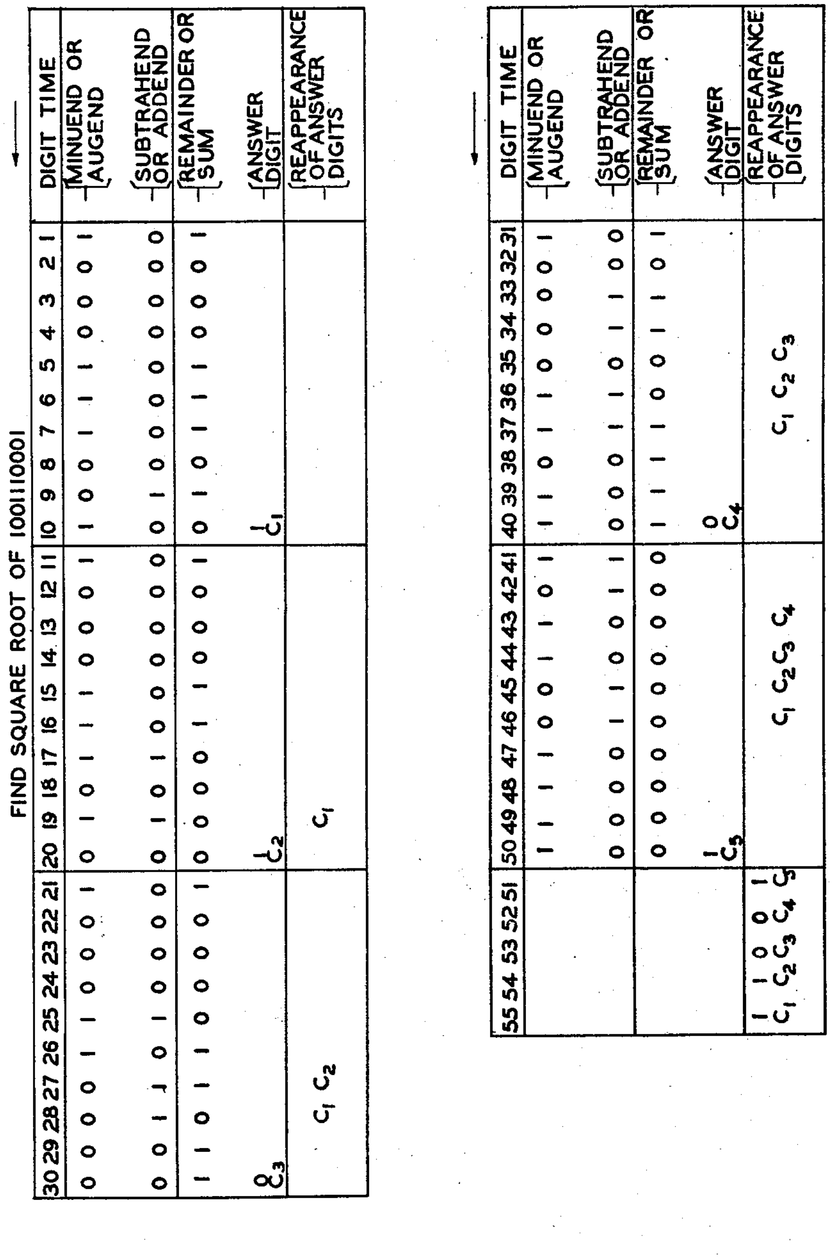
Fig. 9 is a table referred to in the detailed description as an aid to understanding the square rooter action.
Figure 10:
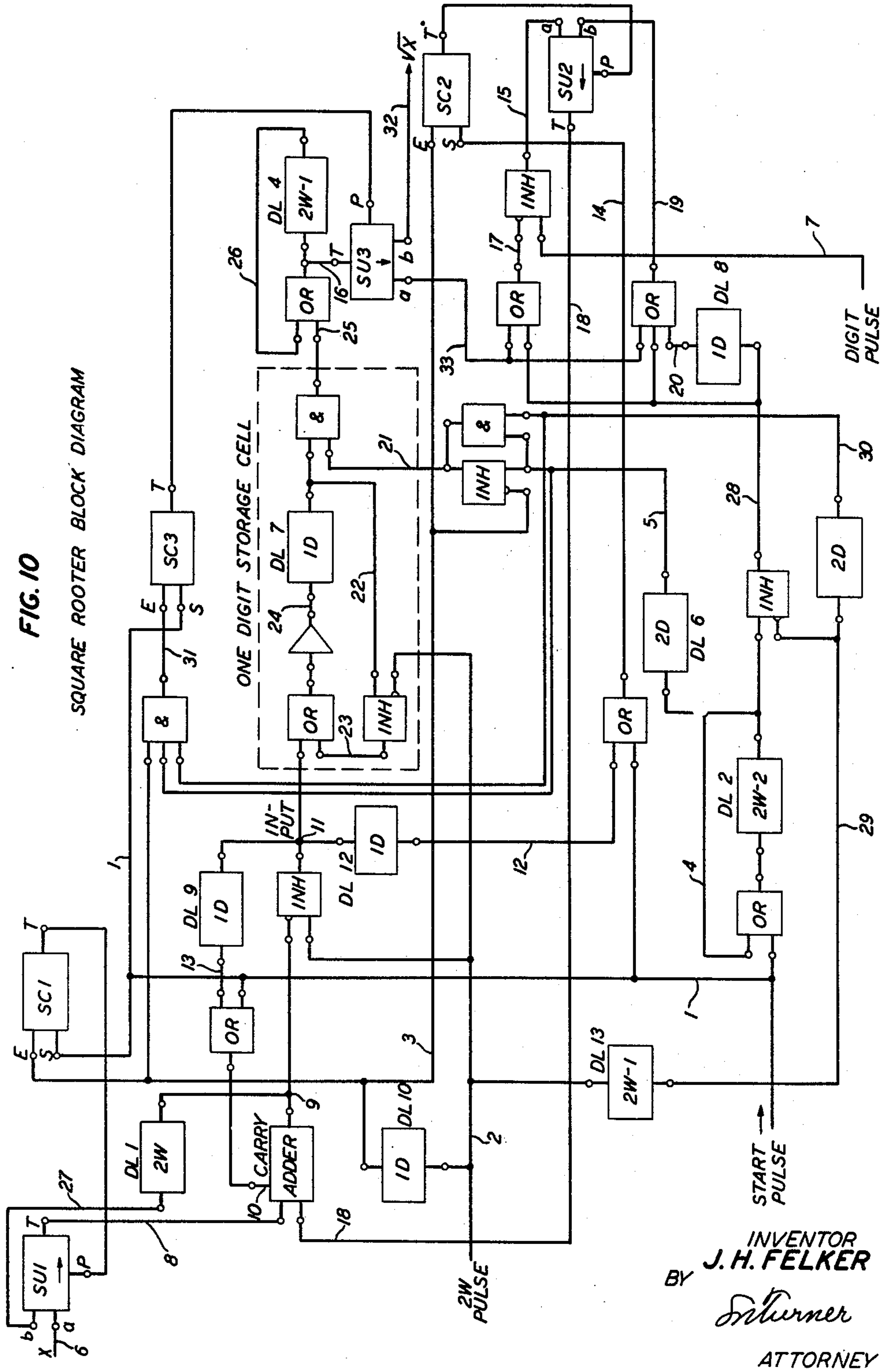
Fig. 10 is a block diagram of a square rooter.

This general description covers a discussion of the circuitry shown in Figs. 1 through 8 of the drawings as a basis for discussion of the square rooter circuit shown in Fig. 10, the action of which is illustrated in Fig. 9.

*The or-circuit*

Figures 1, 2:
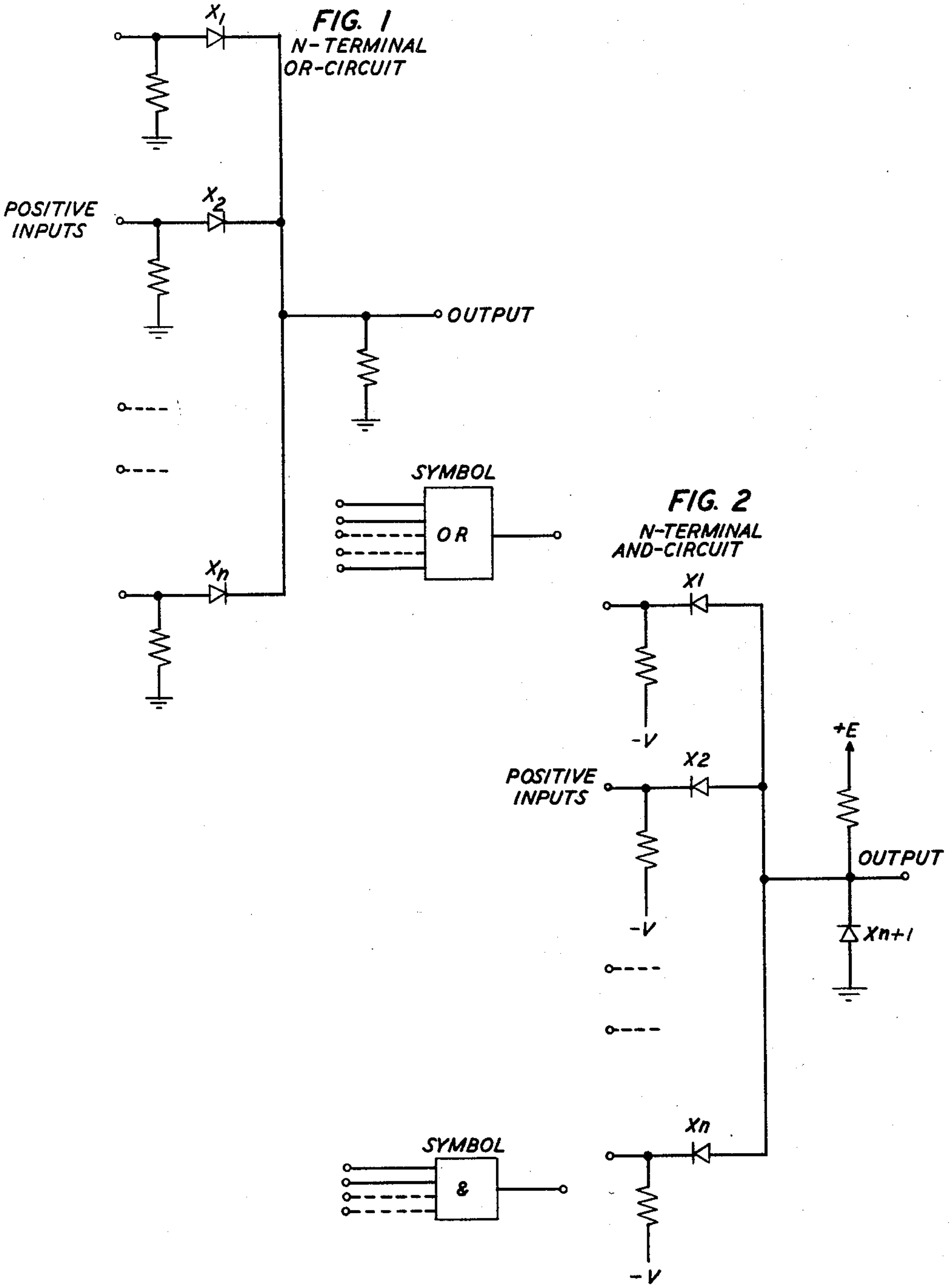
Fig. 1 shows an OR circuit and its symbol.
Fig. 2 shows an AND circuit and its symbol.

With reference to Fig. 1 an $n$ terminal or-circuit is shown which develops an output when any one of the its input terminals is energized by a positive pulse. The elements $X_1$, $X_2$ to $X_N$ may be crystal diodes or dry rectifiers or any other unidirectional asymmetric current carrying device which changes its impedance according to the polarity of the potenital across its terminal. Such elements are put in series with each input to prevent a pulse at one input from feeding back to any of the other inputs. In the lower portion of Fig. 1 is shown the symbol for this or-circuit, which symbol is used in subsequent block diagrams to simplify the showing.

*The and-circuit*

Fig. 2 shows an and-circuit having $n$ input terminals and which develops an output only when all $n$ of the input terminals are energized by positive pulse inputs. Each of the inputs is returned to a negative voltage and the output is clamped slightly below ground by $X_{N+1}$. Only when all of the inputs rise above ground will $X_{N+1}$ be cut off permitting the output to rise. Thus, the output consists of the overlapping parts of the input.

Two terminal and-circuits are used extensively in serial computers for retiming signals. One terminal of the circuit is fed by the signal to be retimed while the other is fed by digit pulses from a master clock. There will be an output from the circuit only for the overlap of the master digit pulse and input signal. The circuit arrangement whereby the output is made a replica of the pulse from the clock is discussed subsequently in connection with Fig. 4.

*The inhibitor-circuit*

Figure 3:
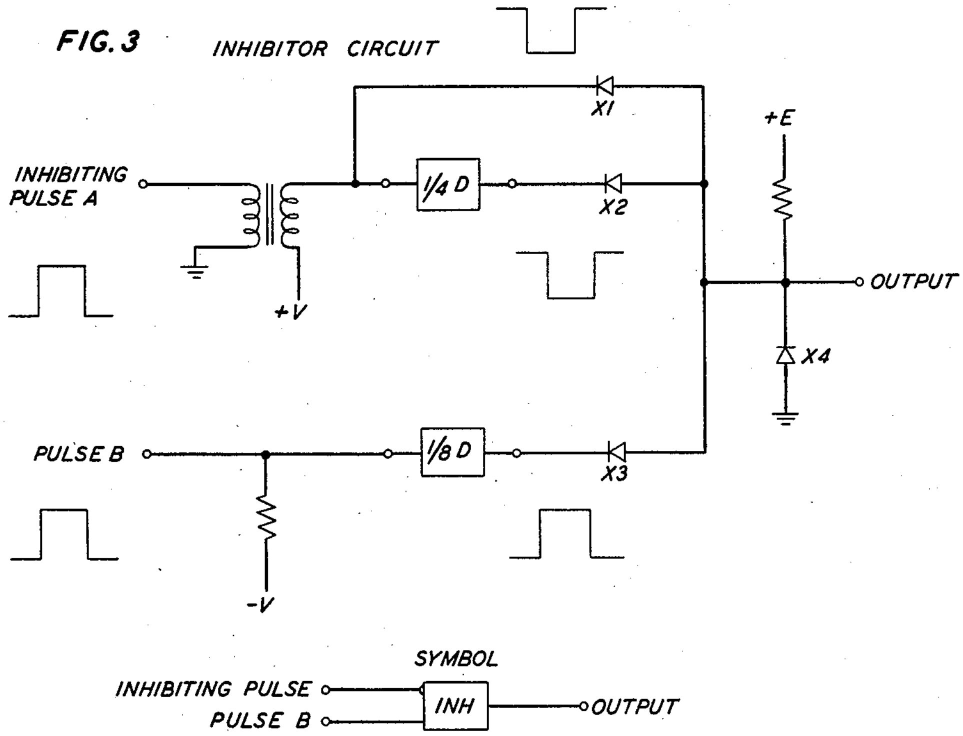
Fig. 3 shows an inhibitor circuit and its symbol.

An inhibitor-circuit is shown in Fig. 3. An inhibitor terminal can be added to any and-circuit or any or-circuit. Such a circuit operates as though there were no inhibitor terminal when the inhibiting pulse is not transmitted. When the inhibiting pulse is present, however, the circuit prevents any output from being developed. The inhibiting-circuit used in this disclosure is of the simple variety shown in Fig. 3 where positive imputs synchronized in time are required. It will be noted that the signal to be inhibited is passed through an eighth digit delay line while the inhibiting pulse is passed both through and around a quarter digit delay line. This insures that the inhibitor pulse will, in effect, arrive earlier than the signal pulse and will last longer. In the absence of input pulses crystal $X_4$ will clamp the output at ground because input B is returned to a negative potential. It will be noted that $X_1$ and $X_2$ are returned through the transformer to a positive potential. If input B goes positive (without an inhibiting pulse appearing on input A), $X_4$ will be cut off and the output voltage will rise until it is clamped at the positive potential to which $X_1$ and $X_2$ are returned. If there is an inhibiting pulse (positive) it is inverted by the transformer and will carry the cathode of $X_1$ and $X_2$ negative, which will keep $X_4$ conducting no matter what happens at B. Thus if pulses A and B were written as a two-digit binary number AB, the circuit translates 01 into a 1 at the output. It translates 00, 10 and 11 into 0 at the output.

*Use of active elements*

Active elements are shown herein as repeating amplifiers to make up for attenuation in crystal circuits and delay line. The standard use would include a timing feature as well as amplification. This proposition is disclosed in Fig. 4.

Figure 4:
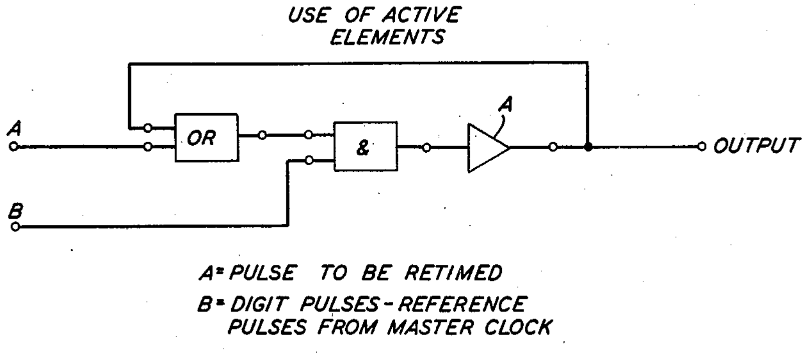
Fig. 4 illustrates by a block diagram the use of active elements, such as an amplifier, for retiming purposes.

In the design of the computer, wherever a pulse is likely to suffer intolerable attenuation, deformation, or a variable delay, a circuit like that of Fig. 4 is inserted.

The circuit shown has two inputs A and B. Input A is the pulse to be retimed and amplified. Input B comes from the master clock. This component supplies reference pulses (known as digit pulses) every digit time. These pulses are available in various phases, that is, with various but accurately controlled delays of a fraction of a digit time. The pulse fed to B is selected to rise sometime between the expected rises and falls of the pulses on A.

If there is no input on A, there will be no output from the amplifier A because of the and-circuit. If there is an input on A, when the digit pulse arrives, the amplifier output will rise with a rise time determined by the digit pulse (assuming that the amplifier pass band does not limit it). Part of the amplifier output is fed back through an or-circuit to the and-circuit. This insures that the output pulse will not fall until the reference digit pulse does, even though pulse A may have entered before B rose.

This reshaping with crystal circuits and an amplifier is the way in which every pulse is maintained with a desired time synchronization. Pulse A may vary somewhat in the delay it has suffered but the output pulse will still leave the amplifier at a time determined only by the reference pulse from the master clock. Thus the pulses in the computer are made to have fixed durations and to occur at designated times.

*Delay lines, amplifiers and master clocks*

In the above discussion so-called delay lines have been referred to. It will be appreciated by those skilled in the art that what is meant by delay lines is the electrical circuit which will delay the output of an input pulse for a certain length of time. Such delay lines could comprise lumped impedances including successive series of lumped inductances with shunt capacity thereacross, as is well known in the art.

The above-mentioned amplifier may comprise any electronic or other amplifier arranged to amplify pulses at a high speed provided such amplifier has sufficient band width as above mentioned such that it will not unduly distort leading and trailing edges of the pulses. An amplifier which is particularly suited for use in the computer circuit disclosed herein is disclosed and claimed in Patent 2,670,445 issued to J. H. Felker on February 23, 1954. However, any suitable amplifier will suffice as will be readily appreciated by those skilled in the art.

Reference has been made previously to such things as a master clock and clock pulses and timing pulses. It is well known in the art that in digital computer circuits it is necessary to provide a master timing clock circuit from which pulses accurately controlled as to phase duration and time may be derived for the purposes of controlling the various functions of the machine. It is not considered necessary to the completeness of the present disclosure for showing all of the details of such a computer timing unit as the details thereof are fully within the knowledge of the art. For instance, a suitable timing unit is disclosed in a publication entitled "A Digital Computer Timing Unit" by R. M. Goodman at pages 1051 through 1054 of the Proceedings of the I.R.E., September 1951, volume 39, No. 9. Repeated reference will be made throughout subsequent description to such master clock timing pulses and such reference relates to such type of circuit as is shown in the above publication by Goodman.

*The storage cell*

The basic storage cell proposed herein is not a static device like a flip-flop but is an electric delay line plus an amplifier. When vacuum tubes are used this type of storage saves one active element in a one-digit storage cell and is believed to be a more reliable use of active elements. In larger storage units more elements will be saved.

Figure 5:
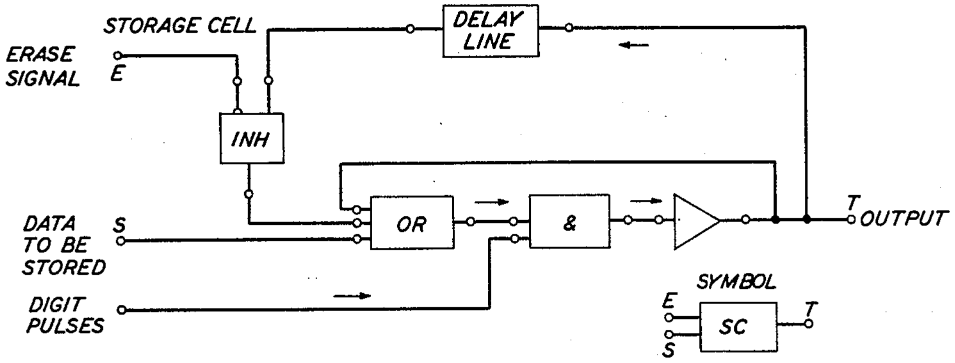
Fig. 5 is a block diagram of a storage cell and its symbol.

A block diagram of such a storage cell is shown in Fig. 5. The unit has three inputs: digit pulses, the signal to be stored, and an erase pulse. The digit pulses are received from the master clock every digit time and are used to retime the output of the delay line before it is amplified and recirculated. The erase signal is received whenever new data are to be stored and serves to erase the data in storage, blocking the delay line output from its input until the new data have been inserted.

The delay line may be long enough to store one word or just one digit of data. It is believed that up to fifteen-digit delay lines with lumped impedances can be built to hold the delay constant within a small fraction of one digit time. Depending upon the length of a word, it may be necessary to break one word line into sections and insert an amplifier between sections to retime and regenerate the pulses stored. At this point it may be stated that the retiming circuit of Fig. 4, as well as amplifiers alone, or inhibitor circuits, may be inserted at many points throughout the circuits of the following description to accomplish additional functions.

*Switches*

Figure 6A:
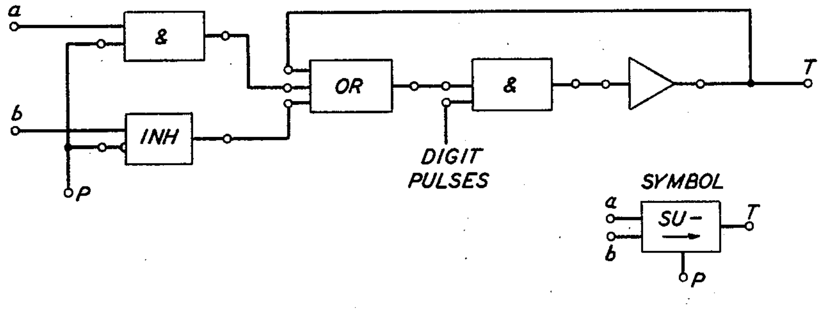
Fig. 6A is a block diagram of a converging type single-pole double-throw switch unit and its symbol.

A switch comprises at least one storage cell like that of Fig. 5 and at least one switch unit like that of Fig. 6A, which happens to be a converging-type switch unit. A switch unit will assume a position according to the output instructions from the associated storage cell and the storage cell in turn is controlled by control signals which store therein or erase therefrom the switching instruction.

Fig. 6A shows a converging switch unit which can switch either of inputs "*a*" and "*b*" to a converging output "T," the direction of information flow being indicated on the symbol as an arrow pointing to the common output terminal T.

Switches are planned to combine a switching and a storage function. When a switch is given instructions to go to a particular position, it goes there and remembers that it is to remain there until unlocked by an erase signal.

Figure 6B:
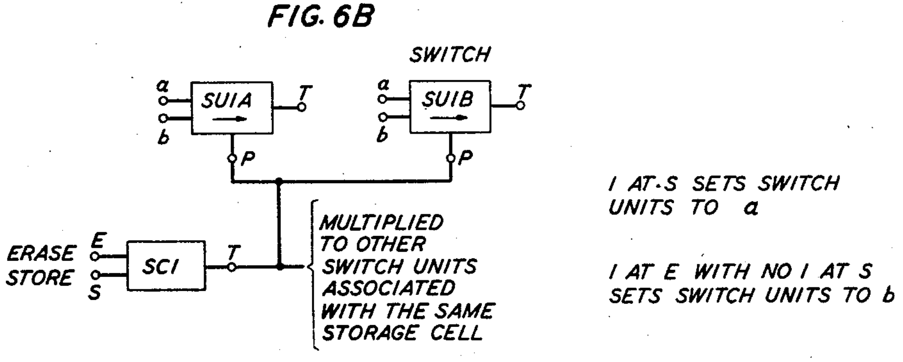
Fig. 6B illustrates how a storage cell like that of Fig. 5 can control one or more switch units like that of Fig. 6A to comprise a single-switch unit or ganged switch units.

Fig. 6B discloses, by means of the symbols for a storage cell and switch units, the necessary elements of ganged single-pole double-throw switch units. It will be obvious that if a switch is to be used as a single-pole single-throw switch, one of the terminals "*a*" and "*b*" will merely be disregarded; that is, not connected.

A single-pole double-throw switch, such as the unit consisting of SC1 and SU1A shown in Fig. 6B, consists of a storage cell and a switch unit. When a 1 is stored in the storage unit, as the result of a pulse on a switching instruction lead, the left-hand and-circuit of the switch unit will pass signal "*a*" while the inhibitor blocks signal "*b*." When a 0 is stored, the and-circuit will block signal "*a*" and the inhibitor circuit in the switch unit will pass signal "*b*."

Whenever the switch is to be reset the erase signal is sent to the storage unit which then drops its old instruction and goes to position "*b*," unless the new instruction sets it to "*a*". A double-pole double-throw switch, as shown in Fig. 6B consisting of SC1 and SU1A and SU1B, would have two switch units and one storage unit. A three or four-pole switch would have three or four switch units, one storage unit and perhaps an extra amplifier to prevent the switch units from loading down the storage unit excessively. Such use of additional switch units with the same storage unit has been indicated in Fig. 6B by the multiple entitled "Multipled to Other Switch Units Associated With the Same Storage Unit."

If it were desired to use a diverging switch unit, the same circuitry as Fig. 6A may be used with slight modification. The "*a*" and "*b*" terminals of Fig. 6A would be connected together to a single terminal marked "T," which would then comprise a single input to the switch unit. The inhibitor circuit would be disconnected from the or-circuit and connected to its own separate or, and, and amplifier arrangement. The terminal "T" of Fig. 6A would be designated "*a*" and the corresponding terminal of the other or, and, and amplifier arrangement for the inhibitor would be designated "*b*." The single input "T" would then be switched to either the "*a*" or the "*b*" output depending upon whether or not the "P" terminal carried a pulse. The symbol for a diverging switch unit would be the same as the symbol for the converging type, as shown in Fig. 6A, except that the arrow would be reversed.

*Handling of negative numbers*

The last digit place of every number may be reserved to indicate the sign of the number. Positive numbers may have a 0 in the last place. A negative number is obtained by taking the two's complement of the positive number. This results in every negative number having a 1 in its last place.

This system is equivalent to the ten's complement method used in decimal calculators. In the decimal calculator operating with three significant figures, a fourth place may be provided for the sign. The number −187 might be represented by its ten's complement 9813. Then, for example, if −187 were required to be added to 500, the operation would be to add 9813 to 500 which gives 10313 and this is recognized as 0313 since the machine is assumed to have only four digit places.

As indicated above a negative number (two's complement) can be obtained in the binary computer by first forming the one's complement (changing all zeros to ones and vice versa by means of an inhibitor-circuit) and then adding one. The calculations illustrated below show examples of binary arithmetic performed with negative numbers.

(A)

| | | | | | | | | |
|---|---|---|---|---|---|---|---|---|
| Formation of negative numbers | | | | | | | | |
| +8= | | 0 | 0 | 1 | 0 | 0 | 0 | |
| One's Complement= | | 1 | 1 | 0 | 1 | 1 | 1 | |
| Add one | | | | | | | 1 | |
| ∴−8= | | 1 | 1 | 1 | 0 | 0 | 0 | |
| Check −8+8= | | 0 | | | | | | |
| +8= | | 0 | 0 | 1 | 0 | 0 | 0 | |
| −8= | | 1 | 1 | 1 | 0 | 0 | 0 | |
| Sum= To the machine | 1 | 0 | 0 | 0 | 0 | 0 | 0 | =zero |

(B)

| | | | | | | | | |
|---|---|---|---|---|---|---|---|---|
| Addition | | | | | | | | |
| −8+5=−3 | | | | | | | | |
| −8= | | 1 | 1 | 1 | 0 | 0 | 0 | |
| +5= | | 0 | 0 | 0 | 1 | 0 | 1 | |
| Sum= | | 1 | 1 | 1 | 1 | 0 | 1 | =−3 |
| Check +3= | | 0 | 0 | 0 | 0 | 1 | 1 | |
| Sum= | 1 | 0 | 0 | 0 | 0 | 0 | 0 | =zero |
| −8+15=7 | | | | | | | | |
| −8= | | 1 | 1 | 1 | 0 | 0 | 0 | |
| +15= | | 0 | 0 | 1 | 1 | 1 | 1 | |
| Sum= | 1 | 0 | 0 | 0 | 1 | 1 | 1 | =7 |

*The adder*

The adder can be considered as a translator with three inputs: addend, augend and carry. It is a simple translator in that its output is a function only of the number of ones among its three inputs, as can be seen from the table set forth below:

BINARY ADDITION

| Inputs | | | Outputs | |
|---|---|---|---|---|
| Addend | Augend | Carry | Sum | New Carry |
| 0 | 0 | 0 | 0 | 0 |
| 0 | 0 | 1 | | |
| 0 | 1 | 0 | 1 | 0 |
| 1 | 0 | 0 | | |
| 0 | 1 | 1 | | |
| 1 | 1 | 0 | 0 | 1 |
| 1 | 0 | 1 | | |
| 1 | 1 | 1 | 1 | 1 |

The block diagram of a typical adder is shown in Fig. 7 wherein the combination in the above table of 0 0 0 is automatically taken care of as a 0 output with 0 carry. The three dashed circuits at the left of the block diagram recognize the other three situations among the three inputs. The situations are: at least one "1," at least two "1's" and three "1's" among the inputs. If there is only one "1" it will go through the bottom or-circuit, the following inhibitor-circuit, and then another or-circuit. After being reclocked and amplified it will provide a "1" as the sum. In this case none of the and-circuits on the A, B and carry leads will have operated. If there are at least two "1's" on the A, B and carry leads, at least one of the three two-terminal and-circuits in the dashed box will operate, with two results. The output of the three-terminal or-circuit at the bottom left of the diagram will be inhibited so that it makes no contribution to the sum. In addition, a carry signal will be developed which is delayed one digit, reclocked and amplified to serve as the carry for the next augend and addend. If there are three "1's" the three-terminal and-circuit at the top and left-hand side of the diagram will operate and will develop a number "1." The three two-terminal and-circuits on the left of the diagram will also operate and will provide the carry.

The inhibitor-circuit in series with the carry lead should be noted. This circuit may be fed by a word pulse from the master clock as well as by the carry digits. The word pulse is received in synchronism with the first digit of every word. The word pulse will inhibit the carry pulse if one is present and will prevent a carry developed in one problem from being used in the next. This feature is required in the addition of negative numbers.

The carry lead may be brought outside the adder to facilitate subtraction. Suppose X is to be subtracted from Y. The number Y might be fed to the augend terminal and the number X fed through an inhibitor-circuit to the addend terminal. The inhibitor would also be fed by digit pulses from the master clock and the addend would therefore be the one's complement of X. A one would be inserted into the carry terminal in synchronism with the first digits of Y and of the one's complement of X. The sum out of the adder would then be $X-Y$. The adder produces a sum within a fraction of a digit time after it receives input. Thus there is only a small delay in obtaining the sum of two numbers.

*The accumulator*

The block diagram of an accumulator is shown in Fig. 8. The output of the adder is sent back to its input through a W digit delay line. The output of the delay line is continuously reclocked in the and-circuit in accord with digit pulses from the master clock. The timed pulses are then amplified in a one-stage amplifier to make up for attenuation in the delay line. Whenever a new accumulation is to be started, an erase signal is sent to the inhibiting circuit. This signal is W digits long and blocks the output of the delay line from the adder and insures that the new accumulation will start from 0.

DETAILED DESCRIPTION OF SQUARE ROOTER

The square root circuit is shown on the block diagram in Fig. 10 and is arranged to obtain the square root of a number to W places in $2W^2$ digit times. It mechanizes the ordinary arithmetic method of taking square roots. Before describing this unit it is well to consider the algebraic basis of the arithmetic method normally used.

*Development of operating principles*

In the development shown below an arithmetic problem is solved in the right-hand column and the justification for each step is shown in the left. It is to be noted that a new digit place is obtained in each step and that the only processes involved, apart from adding zeros, are multiplication by a number less than ten and subtraction.

| *Algebraic procedure* | *Arithmetic procedure* |
|---|---|
| Find $\sqrt{x}$ | Find $\sqrt{123{,}904}$ |
| Step 1: | Step 1: |
| Make first estimate $h_1$ and obtain first remainder. | $h_1=300$ |
| $R_1=x-h_1^2$ | $123904$<br>$-90000$<br>$33904=R_1$ |
| Step 2: | Step 2: |
| Make estimate of increment $h_2$ such that $h_2(2h_1+h_2)\leqq R_1$ and compute second remainder. | Find $h_2$ such that $h_2(600+h_2)\leqq 33904$<br>$50\times 600=30{,}000$ |
| $R_2=R_1-h_2(2h_1+h_2)$ | $\therefore h_2=50$<br>$50(600+50)=32{,}500$ |
| [NOTE.—$R_2=x-(h_1+h_2)^2$] | $33904$<br>$-32500$<br>$1404=R_2$ |
| Step 3: | Step 3: |
| Find $h_3$ such that $h_3[2(h_1+h_2)+h_3]\leqq R_2$ and compute third remainder | Find $h_3$ such that $h_3(2\times 350+h_3)\leqq 1404$<br>$2\times 700=1400$ |
| $R_3=R_2-h_3[2(h_1+h_2)+h_3]$ | Try $h_3=2$<br>$2(700+2)=1404$ |
| [NOTE.—$R_3=x-(h_1+h_2+h_3)^2$] | $1404$<br>$-1404$<br>$0000=R_3$<br>$\therefore (h_1+h_2+h_3)^2=123{,}904$<br>$\sqrt{123904}=352$ |

Step N:

$$R_n=R_{n-1}-h_n[2(h_{n-1}+h_{n-2}+h_{n-3}+\ldots+h_1)+h_n]$$

$$\sqrt{x}\cong h_1+h_2+h_3\ \ldots\ h_n$$

The above arithmetic method can be extended to binary operation as shown in the development below. Binary operation is somewhat simplified because the only processes needed besides adding zeros, are multiplication by one or zero and subtraction.

Find square root 1101001001

| | | $h_1$ | $h_2$ | $h_3$ | $h_4$ | $h_5$ | |
|---|---|---|---|---|---|---|---|
| | | 1 | 1 | 1 | 0 | 1 | |
| | | $\sqrt{}$ 11 | 01 | 00 | 10 | 01=841 | |
| $h_1^2$ | ⟶ | 01 | 00 | 00 | 00 | 00 | |
| | 0101000000 | 10 | 01 | 00 | 10 | 01 | ⟵ $R_1$ |
| $h_2(2h_1+h_2)$ | ⟶ | 01 | 01 | 00 | 00 | 00 | |
| | 0011010000 | 01 | 00 | 00 | 10 | 01 | ⟵ $R_2$ |
| $h_3[2(h_1+h_2)+h_3]$ | ⟶ | 00 | 11 | 01 | 00 | 00 | |
| | 0001110000 | 00 | 00 | 11 | 10 | 01 | ⟵ $R_3$ |
| $h_4[2(h_1+h_2+h_3)+h_4]$ | ⟶ | 00 | 00 | 00 | 00 | 00 | |
| | 0000111001 | 00 | 00 | 11 | 10 | 01 | ⟵ $R_4$ |
| $h_5[2(h_1+h_2+h_3+h_4)+h_5]$ | ⟶ | 00 | 00 | 11 | 10 | 01 | |
| | | 00 | 00 | 00 | 00 | 00 | ⟵ $R_5$ |

$h_1=10000=2^p=2^4$
$h_2=\ 1000=2^{p-1}=2^3$
$h_3=\ 100=2^{p-2}=2^2$
$h_4=\ 00=$ (zero times $2^{p-3}$) $=0$
$h_5=\ 01=2^{p-4}=2^0$ $\sqrt{x}=11101=29$ For square root machine operation, there is a drawback to the method illustrated immediately above. Sometimes, as in the fourth step, the subtrahend must be multiplied by 0, not 1, before it is subtracted. The only way the machine can find out it should have multiplied by 0 is for it to assume it should multiply by 1, form the subtrahend on that assumption, and subtract it. If the machine obtains a negative remainder it knows that it should not have subtracted anything at all. The simplicities of binary arithmetic make it possible to devise a method of operation in which the necessity of adding back the subtrahend is avoided. This procedure is believed to be a basically new contribution to the art.

Suppose, with reference to the algebra of the above set forth arithmetic procedure, that the machine is taking the square root of $x$ and has just established the partial answer $$y_{n-1}=h_1+h_2 \ldots h_{n-1}$$

and is about to determine the value of $h_n$, where $h_n$ will be either a 1 or a 0 multiplied by $2^p$ where $p$ is an integer. The partial answer $y_{n-1}$ is the sum of a number $(n-1)$ of binary order increments $h_1$, $h_2$, etc. to $h_{n-1}$ where each increment $h$ is a one (1) or a zero (0) and represents respectively a different integral power of two (2) or nothing. The treatment assumes that the $n$th increment is about to be ascertained and the fact is that $h_n$ will be either a one (1) or a zero (0) and that it will, if a one (1), represent a power of two (2) depending upon the order of that $n$th position in the answer. For instance, if the answer $y_n$ is going to be a six-digit binary number 110011, then $h_1$ is 1, $h_2$ is 1, $h_3$ is 0, $h_4$ is 0 and the $n$th increment ($h_5$) will be a 1. Furthermore, $h_1$ represents one times $2^5$, $h_2$ represents one times $2^4$, $h_3$ represents zero times $2^3$, $h_4$ represents zero times $2^2$, and $h_5$ will represent one times $2^1$. The letter $p$ is the power of two (2) represented by $h_5$; that is, in the example $p$ is 1 and the $n+1$'th increment $h_6$ (or $h_{n+1}$), when ascertained, will represent $2^{p-1}$ or $2^0$.

At this stage the remainder in the machine is $$R_{n-1}=x-y_{n-1}^2$$

and the next operation will be to form the trial subtrahend $$(2y_{n-1}+2^p)2^p$$

and to subtract it from $R_{n-1}$, which will leave as the new remainder $$R_n=x-(y_{n-1}+2^p)^2=x-y_n^2$$

If $R_n$ is a positive number, the machine will enter a 1 as the coefficient of $2^p$ in the answer and will proceed to obtain the coefficient of $2^{p-1}$ in a similar manner.

If, on the other hand, $R_n$ turns out to be negative, the machine should write 0 as the coefficient of $2^p$ in the result (thus $y_n=y_{n-1}$) and should subtract $$(2y_n=2^{p-1})2^{p-1}=(2y_{n-1}+2^{p-1})2^{p-1}$$

from $R_{n-1}$, which would give the correct value $$R_{n+1}=x-(y_n+2^{p-1})^2=x-(y_{n-1}+2^{p-1})^2$$

Unfortunately, the machine does not have $R_{n-1}$ available because it has subtracted and obtained $R_n$. However, to get the desired $R_{n+1}$, the machine need only add to the erroneous $R_n$ $$[2y_n+3(2^{p-1})]2^{p-1}$$

instead of subtracting $$(2y_n+2^{p-1})2^{p-1}$$

which would have been done if $R_n$ had been positive. This result is justified by the steps set forth next.

$$R_n=x-(y_{n-1}+2^p)^2=x-y_n^2$$

If $R_n$ is positive, insert 1 as the coefficient of $2^p$ and proceed with a new trial subtrahend $(2y_n+2^{p-1})2^{p-1}$ $$R_{n+1}=R_n-(2y_n+2^{p-1})2^{p-1}$$
$$=x-y_n^2-2y_n2^{p-1}-2^{2(p-1)}$$
$$=x-(y_n+2^{p-1})^2=x-y_{n+1}^2$$

but, if $R_n$ is negative, then insert 0 as coefficient of $2^p$, which means that $y_n=y_{n-1}$ and the new remainder $R_{n+1}$ is shown as $$R_{n+1}=R_{n-1}-(2y_{n-1}+2^{p+1})2^{p-1}$$

However $R_{n-1}$ is not available but $R_n$ is in lieu thereof.

Now $R_{n-1}=R_n+(2y_{n-1}+2^p)2^p$ $\therefore R_{n+1}=R_n+(2y_{n-1}+2^p)2^p-(2y_{n-1}+2^{p-1})2^{p-1}$ But, when the coefficient of $2^p$ is 0 due to a negative $R_n$, then $y_{n-1}=y_n$ and $$R_{n+1}=R_n+(2y_n+2^p)2^p-(2y_n+2^{p-1})2^{p-1}$$
$$=R_n+2y_n2^p+2^{2p}-2y_n2^{p-1}-2^{2(p-1)}$$
$$=R_n+2^{p-1}[2y_n2^1+2^{p+1}-2y_n-2^{p-1}]$$
$$=R_n+2^{p-1}[2y_n+(2^{p+1}-2^{p-1})]$$

Looking at the expression $2^{p+1}-2^{p-1}$ we find:

if $p=1$, $2^{p+1}-2^{p-1}=2^2-2^0=4-1=3=3(2^0)=3(2^{p-1})$ if $p=2$, $2^{p+1}-2^{p-1}=2^3-2^1=8-2=6=3(2^1)=3(2^{p-1})$ if $p=3$, $$2p+1-2^{p-1}=2^4-2^2=16-4=12=3(2^2)=3(2^{p-1})$$

etc., thus $(2^{p+1}-2^{p-1})=3(2^{p-1})$.

Therefore, $$R_{n+1}=R_n+[2y_n+3(2^{p-1})]2^{p-1}$$

and $R_{n+1}$ may be obtained by adding $[2y_n+3(2^{p-1})]2^{p-1}$ to $R_n$ (now in the machine) instead of subtracting the usual trial subtrahend $(2y_n+2^{p-1})2^{p-1}$ from $R_{n-1}$ (which was eliminated in determining the negative $R_n$).

There is only a slight difference in the two operators above. When a positive remainder is obtained, the machine adds 01 times $2^{p-1}$ to $2y$ and then adds $2^{p-1}$ zeros at the end of the sum to obtain the new operator. In the event that a negative remainder is obtained, the machine adds 11 (3) times $2^{p-1}$ to $2y$ and then adds $2^{p-1}$ zeros at the end of the sum. Below are given two examples of the simplified method:

Example 1:

Find the square root of 1101001001=841

```
                  1  1  1  0  1=29
               √ 11 01 00 10 01
                -01 00 00 00 00
                ---------------
0101000000   |   10 01 00 10 01
                -01 01 00 00 00
                ---------------
0011010000   |   01 00 00 10 01
                -00 11 01 00 00
                ---------------
0001110100   |   00 00 11 10 01
                -00 01 11 01 00
                ---------------
0000111011   |   11 11 00 01 01   <- Note Negative Number
                +00 00 11 10 11
                ---------------
                 00 00 00 00 00
```

Note Negative Number $h_1$=10000=16    $h_4$= 00=0
$h_2$= 1000= 8    $h_5$= 01=1
$h_3$=  100= 4

11101=result=29

Example 2:

```
                 Find square root 1001110001=625

                          1  1  0  0  1=25
                       √ 10 01 11 00 01
                        -01 00 00 00 00
                       ________________
0101000000            |  01 01 11 00 01
                        -01 01 00 00 00
                       ________________
0011010000            |  00 00 11 00 01
                        -00 11 01 00 00
                       ________________
0001101100            |  11 01 10 00 01
                        +00 01 10 11 00
                       ________________
0000110011            |  11 11 00 11 01
                        +00 00 11 00 11
                       ________________
                         00 00 00 00 00

Note
 Negative
 Remainder
```

The square root machine shown in Fig. 10 obtains a new digit of a W digit answer every 2W digit times. In each 2W period the machine either substracts or adds, depending on whether the digit determined in the previous period is a 1 or a 0. The remainder becomes the next minuend, if positive, or the next augend, if negative. The respective next subtrahend or addend is formed partly from the answer digits already obtained and is formed therefrom into one of two operators depending upon whether the remainder was positive or negative. The manner of forming the operator is dependent upon the value of the digit determined in the preceding step as is the decision as to whether the operator is added or subtracted.

Before going into a discussion of the block diagram it is well to consider in detail how the square root of a specific number would be taken. For this purpose a relatively short number is more convenient than a larger one. In Fig. 9 the above last set forth example of simplified binary square rooting (for which $W=5$) has been rearranged in the sequence in which the digits would be operated upon by a machine. As shown in Fig. 9, the top row lists the time (measured in digit times from the start of the problem) at which the digits listed arrive. The second row lists the digits of the operators that are used either as minuends or augends. The third row lists the digits that make up the operators used as subtrahends or addends. The fourth row shows the results of subtracting or adding the operators above, and the next row shows the answer digits as they are obtained. The final row shows when the answer digits are required to reappear in order to be used in the third row.

As Fig. 9 shows, in the first period the first operator is the number (of $2W$ digits=10) whose square root is desired, while the second operator is a 1 inserted at digit time $2W-1$ (9). The last digit of the remainder is examined at time $2W$ (10). Since the digit examined is a 0 (positive remainder), $C_1$ is written as 1, the most significant digit of the answer. If the 2W'th digit were 1 (negative answer), 0 should be written in the answer as the coefficient of 2W. Since in the example $C_1$ is written as 1, the remainder of the first step is used as the minuend for the next period. The subtrahend for the next period is formed by the digit $C_1$ (time 10) delayed $2W-1$ (9) digit times so that it arrives at digit time 19 and by the 1 subtracted in period one (time 9) delayed by $2W-2$ (8) digit times so that it arrives at digit time 17. The digit $C_1$ was a 1, so in the second period subtraction is performed and the 2W'th digit of the remainder examined. This digit is seen to be a 0, so the remainder obtained on the second 2W period is used as the minuend for the third period and a 1 is written in the answer as $C_2$.

The subtrahend for the third step is formed from the digit $C_1$ (time 19) delayed $2W-1$ (9) digit times so that it arrives at digit time 28, the digit $C_2$ (time 20) delayed by $2W-3$ (7) digit times so that it arrives at digit time 27, and a 1 delayed $2W-2$ (8) digit times from the time 17 it was used in step 2 to arrive at digit time 25.

The remainder of the third step has a 1 in the 2W'th place, indicating it is negative. The remainder is, therefore, used as the augend for the fourth 2W period and a 0 is written as $C_3$. The addend for the fourth period is formed by delaying the number $C_1C_2$ (times 28 and 27) by $2W-1$ (9) digit times from the time it was used previously so as to arrive at digit times 37 and 36, by delaying digit $C_3$ (time 30) $2W-5$ (5) digit times so that it arrives at time 35, and at digit times 33 and 34 writing ones. The 1 at time 33 is the one previously written at time 25 delayed by $2W-2$ (8) digit times. The 1 written at time 34 is written because the remainder of the third period was negative and is the 1 written at time 33 delayed 1 digit time.

From Fig. 9 it is seen that the sum in the fourth step is still negative. The sum is used as the augend for the fifth step and another 0 is written in the answer as $C_4$. The addend for the fifth step is formed by the word $C_1C_2C_3$ (times 37, 36 and 35) delayed by $2W-1$ (9) digit times from the time it was used in the fourth step so as to arrive at times 46, 45 and 44, the digit $C_4$ (time 40) delayed by $2W-7$ (3) digit times so that it arrives at time 43, and the word 11 delayed by $2W-2$ (8) digit times from the time (times 34 and 33) it was used in the fourth period so as to arrive at times 42 and 41. The 1 (time 33) is delayed $2W-2$ (8) digit times so as to arrive at times 41 and the 1 at time 42 is the 1 at time 41 delayed 1 digit time. When this addend is added, the 2W'th digit of the sum is a 0, the sum is zero indicating completion of the problem, and a 1 is written in the answer as $C_5$.

*Rules for operation of square root machine*

The procedure can be generalized as the following rules for using the adder to obtain the square root of $x$, where the square root is written as $C_1C_2C_3C_4$ etc., and each coefficient is a 1 or a 0. In the following discuscussion, the terms "minuend" and "augend" mean the same operator and the terms "subtrahend" and "addend" mean the same operator. This is because sometimes the machine performs actual addition while at other times actual subtraction takes place—but the subtraction is accomplished by complementary addition.

*Rule 1.*—Examine every 2W'th digit of the output of the adder, and if the examined digit is 0, write 1 as the answer digit. If the examined digit is 1, write 0 as the answer digit.

*Rule 2.*—In the first 2W period, use $x$ as the augend. In all other periods, use the output of the adder (see "Adder" of Fig. 10) delayed by 2W digit times as the augend.

*Rule 3.*—In the first 2W period form the addend for the adder by taking the 2's complement of a number that consists of a single one written at digit time $2W-1$. In all other periods determined the addend according to rule 4.

*Rule 4.*—If the answer digit $C_{n-1}$ as determined in the $n-1$'th 2W period is a 1, form the addend for the $n$th period by rule 5. If $C_{n-1}$ is a 0, form the addend by rule 6.

*Rule 5.*—Form the addend for the $n$th period by taking the 2's complement of Q where Q consists of the three parts:

(*a*) The words $C_1C_2 \ldots C_{n-2}$ delayed by $2W-1$ digit times from its use in the previous step.

(*b*) The digit $C_{n-1}$ delayed by $2W+3-2n$ from the time it was obtained in the previous step.

(*c*) The digit 1 written two digits earlier than $C_{n-1}$.

*Rule 6.*—Form the addend for the *n*th period from the three parts listed below:

(*a*) The same as in rule 5.

(*b*) The same as in rule 5.

(*c*) The same as in rule 5 with an extra 1 inserted at digit time $2W+2-2$ of the *n*th 2W period.

*The block diagram*

One way of studying the block diagram of Fig. 10 is to take each of the rules stated above and see how they are implemented. In this connection, reference is suggested to Tables 1, 2 and 3 at the end of the specification and to Fig. 11. These aids will show exactly how the circuit satisfies these rules for an assumed example.

RULE 1

The machine receives a pulse every 2W digits on conductor 2 from the master clock. This pulse goes to the inhibitor-circuit that is connected to the output of the adder. The inhibitor, therefore, examines every 2W'th digit of the adder output and develops a 1 on conductor 11 if the adder output digit is 0 and develops a 0 on conductor 11 if the adder output digit is a 1. Thus the successive output digits of the inhibitor at conductor 11 can be taken as the successive digits of the square root of *x*. Each output of the inhibitor is stored temporarily in a one-digit storage cell (DL7, etc.) until it can be written into DL4, which stores the complete answer.

The examining pulse that occurs every 2W digits also goes to the inhibitor in the one-digit storage cell to act as the erase signal, thereby to remove $C_{n-1}$ when $C_n$ is stored. That is, at the second examine time (4W) the 2W examine pulse on conductor 2 will inhibit the recircultaing previous answer digit on conductor 22, thereby to permit whatever is on conductor 11 at that time to enter DL7 without conflict with any previous pulse.

RULE 2

During the first 2W period, SU1 is in position "*a*" due to a start pulse on conductor 1 at time 1 having signaled the storage cell SC1 to that effect coincident with the insertion of time 1 of the least significant digit of *x* into the machine on conductor 6, and the augend for the adder is *x* transmitted over conductor 6 through this position to conductor 8. Thereafter, SU1 is at "*b*" and the augend on conductor 8 is the adder output on conductor 9 delayed by 2W digits in DL1 to appear on conductor 27. SU1 is sent to the "*b*" position at time 2W+1 (time 11) when the 2W examine pulse on conductor 2 at time 10 is delayed by one digit in DL10 so as to appear on conductor 3 at time 11 to send an erase signal to the storage cell SC1.

RULE 3

Coincidentally with the transmission of the least significant digit of *x* into the machine at time 1, a start signal is received from the master clock on conductor 1, which sends SU2 to position "*a*" by sending a store signal to SC2 through an or-circuit and over conductor 14. The start signal on conductor 1 also progresses through an eight-digit delay in DL2 to arrive on conductor 4 at an inhibitor-circuit feeding conductor 28 at time 2W—1 (9). The pulse on conductor 28 extends through an or-circuit to conductor 17 where it inhibits the digit pulse on conductor 7. The latter inhibitor-circuit has an output on conductor 15, therefore, which is the 1's complement of 01000 . . . 0. This is because conductor 15 carries all digit pulses from conductor 7 except when there is a pulse on conductor 17. To convert this to a 2's complement, the start signal on conductor 1 is fed directly to the carry terminal of the adder through an or-circuit to conductor 10. The machine cannot subtract in fact, so, wherever subtraction is to occur it is necessary to change the subtrahend (or addend) to the 2's complement and add. This in effect is the same as subtraction, as has been discussed above under General Description. The 10111 . . . 1 fed over conductor 15 to terminal "*a*" of switch unit SU2 is transmitted therethrough and over conductor 18 to the lower left input of the adder of Fig. 10. Simultaneously with the digit time 1, the start pulse on conductor 1 is fed through an or-circuit (feeding the "carry" terminal of the adder) to the carry terminal of the adder on conductor 10. The net effect of adding the carry 1 to the 10111 . . . 1 is to change the latter to 11000 . . . 0, which is the 2's complement of the desired addend (or subtrahend). Thus, the desired subtrahend (or addend) is changed into its 2's complement in order that addition can be used to accomplish a subtraction function.

RULE 4

The operating instructions for switch SU2 are obtained from the inhibitor in the adder output on conductor 11 as well as from the start signal on conductor 1. SU2 is of the type discussed above under the General Description of Switches. Every time a new digit of the answer is determined at conductor 11, it is fed over conductors 12 and 14 to the input terminal of the storage cell (through a one-digit delay line DL12 and through an or-circuit which isolates the start pulse on conductor 1 from the inhibitor output on conductor 11) associated with the switch SU2, which is adjusted at time $2W+1$, etc. to "*a*" if the digit on conductor 14 is a 1 or to "*b*" if the digit on conductor 14 is a 0. Coincidentally with the existence at time $2W+1$ on conductor 14 of the answer digit, the 2W pulse on conductor 2 delayed one digit time in DL10 is fed over conductor 3 to the erase terminal of the storage cell SC2 for switch SU2 to remove at time $2W+1$ the previously stored instruction, so that the switch can move to the new position if such is dictated. Setting switch SU2 to "*a*" is equivalent to saying, "follow rule 5" and setting switch SU2 to "*b*" is equivalent to saying "follow rule 6."

RULE 5

When digit $C_1$ is determined on conductor 11 at time 2W, it goes over conductor 24 into the one-digit delay line DL7 and recirculates there until $C_2$ is determined. The recirculation of the digit $C_1$ takes place over conductors 22 and 23 so long as a pulse does not appear on conductor 2 to inhibit the recirculating digit. This inhibiting takes place at each occurrence of the 2W examine pulse on conductor 2, thereby inhibiting the recirculating $C_1$ digit when $C_2$ is determined on conductor 11. At time $2W+1$ (11) the start signal on conductor 1 delayed 8 digits in DL2 and 2 digits in DL6 appears on conductor 5. It is inhibited, however, from reaching conductor 21 by the 2W pulse on conductor 2 delayed one digit in DL10 and arriving at conductor 3 at $2W+1$ (11). The recirculated start signals from DL2 and appearing on conductor 4 are all delayed two digits by DL6 and reappear at the output of DL6 on conductor 5 in each 2W period at the times listed below:

| Period | Time | Digits Entered in DL4 |
|---|---|---|
| 2 | 2W+1 (11) | None |
| 2 | 4W−1 (19) | $C_1$ |
| 3 | 6W−3 (27) | $C_2$ |
| 4 | 8W−5 (35) | $C_3$ |
| 5 | 10W−7 (43) | $C_4$ |
| 6 | 12W−9 (51) | $C_5$ |

The output of DL6 on conductor 5, in each case above except the first (when it is inhibited), goes via conductor 21 to an and-circuit in the one-digit storage cell and lets a digit of the answer into DL4 over conductors 25 and 16. The input of DL4 on conductor 16 is also fed through the "*a*" position of switch SU3 to conductor 33, through an or-circuit to conductor 17, through an inhibitor to the "*a*" input of SU2 via conductor 15, and back to the adder to mechanize part "*b*" of rule 5. The start pulse on conductor 1 at time 1 sets switch SU3 at "*a*" and the switch remains at "*a*" until time 51 where the coincidence of pulses on conductors 3, 5 and 30 sends it to "*b*." Since $C_1$ first enters DL4 at $4W-1$ (19) it will reenter it after 9 digits delay in DL4 at $6W-2$ (28) just behind the first entry of $C_2$ at $6W-3$ (27), which is as it should be to fulfill part "*a*" of rule 5.

Part "*c*" of rule 5 is fulfilled by the recirculated start pulse from DL2 on conductor 4 and which appears at times 9, 17, 25, 33, 41 and 49. Conductor 28 will also carry this pulse at the same times except at time 49 when an inhibiting pulse appears on conductor 29. These pulses on conductor 28 appear on conductor 17 through an or-circuit. It may be noted that DL6 provides the two-digit delay required between $C_{n-1}$ and the "1" digit of part "*c*" of rule 5. That is, DL6 provides a pulse on conductor 5 two digits later than conductor 4 and this pulse on conductor 5, occurring at times 11, 19, 27, 35 and 43, appears also on conductor 21 and permits the previously determined answer digit on conductor 22 to extend through an or-circuit to conductor 16 and through the "*a*" position of switch SU3 to conductor 33, thus feeding conductor 17.

The inhibitor at terminal "*a*" of SU2 will provide on conductor 15 the 1's complement of Q on conductor 17 (see rule 5). The 2's complement is obtained by feeding the output of the inhibitor on the adder output at conductor 11 back into the carry terminal at conductor 10 of the adder. The one-digit delay line (DL9) is required to get the carry on conductors 13 and 10 at $2W+1$ (11) rather than at 2W (10).

RULE 6

Parts "*a*" and "*b*" of this rule are fulfilled by the connection of the input of DL4 on conductor 16 through SU3 to conductor 33 and to conductor 19 through an or-circuit into terminal "*b*" of SU2. Part "*c*" is fulfilled by the connection of the output of DL2 into terminal "*b*" of SU2 through an or-circuit, both directly and through the one-digit delay line DL8. The pulses on conductor 28 at times 9, 17, 25, 33 and 41 also feed conductor 19 through the or-circuit. Also, conductor 20 feeds conductor 19 the same pulses one digit later at times 10, 18, 26, 34 and 42.

At time 51, pulses appear on conductors 3, 5 and 30. This causes a pulse to appear on conductor 21 (via an and-circuit from conductors 5 and 30) to permit the fifth answer digit into conductor 25 and thence into conductor 16 just one digit time ahead of the other four answer digits emerging from DL4 on conductor 26. Also a pulse will appear on conductor 31 (via an and-circuit from conductors 3, 5 and 30), thereby switching the unit SU3 to its "*b*" position. This permits the five answer digits to emerge onto conductor 32 as follows 11001—giving the square root of *x*.

Fig. 11 of the drawings is a chart showing the existence (1) or non-existence (0) of a pulse on each of the conductors 1 through 33 of Fig. 10 for each single digit time for the entire 55 digit times of the assumed example. Fig. 11 also indicates the position of switches SU1, SU2, and SU3 throughout the problem. Tables 1, 2 and 3 below indicate how the condition of each conductor and switch is ascertained for each digit time in the assumed example.

*Table 1.—Switch conditions of Fig. 10*

| Switch | Explanation |
|---|---|
| SU1 | Directed to position "*a*" whenever conductor 1 carries a pulse. |
| SU1 | Directed to position "*b*" whenever conductor 3 carries a pulse and conductor 1 does not. |
| SU1 | Remains in the position to which it is directed until it is directed to the other position. |
| SU2 | Directed to position "*a*" whenever conductor 14 carries a pulse. |
| SU2 | Directed to position "*b*" whenever conductor 3 carries a pulse and conductor 14 does not. |
| SU2 | Remains in the position to which it is directed until it is directed to the other position. |
| SU3 | Directed to position "*a*" whenever conductor 1 carries a pulse. |
| SU3 | Directed to position "*b*" whenever conductor 31 carries a pulse and conductor 1 does not. |
| SU3 | Remains in the position to which it is directed until it is directed to the other position. |

*Table 2.—Pulse conditions of conductors of Fig. 10*

| Conductor | Explanation |
|---|---|
| 1 | Pulse only at digit time 1. |
| 2 | Pulse only at every tenth digit time; i.e., digit times 10, 20, 30, 40, 50. |
| 3 | Conductor 2 delayed one digit; i.e., times 11, 21, 31, 41, 51. |
| 4 | Conductor 1 delayed eight digits and recirculated every eight digits; i.e., times 9, 17, 25, 33, 41, 49. |
| 5 | Conductor 4 delayed two digits; i.e., times 11, 19, 27, 35, 43, 51. |
| 6 | X inserted digitally in the order 1000111001 for times 1 through 10. |
| 7 | Pulse every digit time. |
| 8 | Conductor 6 when SU1 is at "*a*." Conductor 27 when SU1 is at "*b*." |
| 9 | The digital sum of conductors 8, 10 and 18. |
| 10 | Pulse only when at least one of conductors 1 and 13 carries a pulse. |
| 11 | Pulse only when conductor 2 carries a pulse and conductor 9 does not. |
| 12 | Conductor 11 delayed one digit. |
| 13 | Conductor 11 delayed one digit. |
| 14 | Pulse only when at least one of conductors 1 and 12 carries a pulse. |
| 15 | Opposite of conductor 17 (i.e., the one's complement of conductor 17). |
| 16 | Pulse only when at least one of conductors 25 and 26 carries a pulse. |
| 17 | Pulse only when at least one of conductors 28 and 33 carries a pulse. |
| 18 | Conductor 15 if SU2 is at "*a*." Conductor 19 if SU2 is at "*b*." |
| 19 | Pulse only when at least one of conductors 20, 28 and 33 carries a pulse. |
| 20 | Conductor 28 delayed one digit. |
| 21 | Pulse only when conductor 5 carries a pulse and conductor 3 does not. |
| 22 | Conductor 24 delayed one digit. |
| 23 | Pulse only when conductor 22 carries a pulse and conductor 2 does not. |
| 24 | Pulse only when at least one of conductors 11 and 23 carries a pulse. |
| 25 | Pulse only when each of conductors 21 and 22 carries a pulse. |
| 26 | Conductor 16 delayed nine digits. |
| 27 | Conductor 9 delayed ten digits. |
| 28 | Pulse only when conductor 4 carries a pulse and conductor 29 does not. |
| 29 | Conductor 2 delayed nine digits. |
| 30 | Conductor 29 delayed two digits. |
| 31 | Pulse only when each of conductors 3, 5 and 30 carries a pulse. |
| 32 | Conductor 16 when SU3 is at "*b*." Nothing when SU3 is at "*a*." |
| 33 | Conductor 16 when SU3 is at "*a*." Nothing when SU3 is at "*b*." |

*Table 3.—Preferred order of conductor and switch unit consideration of Fig. 10*

| Conductor | Explanation |
|---|---|
| A | Conductors 1, 2, 3, 4, 5, 7, 20, 21, 28, 29, 30, and 31 are fixed. |
| B | Conductor 6 is the number X whose square root is desired. |
| C | Switch SU1 positions are fixed by conductors 1 and 3. |
| D | Switch SU3 positions are fixed by conductors 1 and 31. |
| E | Conductor 8 is conductor 6 when SU1 is at "*a*" and is conductor 27 when SU1 is at "*b*." |
| F | Conductors 12 and 13 are fixed by what conductor 11 was one digit earlier. |
| G | Conductor 14 is determined by conductors 12 and 1. |
| H | Switch SU2 positions are fixed by conductors 3 and 14. |
| I | Conductor 10 is determined by conductors 1 and 13 and by any internal "carry" of the adder. |
| J | Conductor 22 is fixed by what conductor 24 was one digit earlier. |
| K | Conductor 23 is determined by conductors 22 and 2. |
| L | Conductor 25 is determined by conductors 21 and 22. |

*Table 3.—Preferred order of conductor and switch unit consideration of Fig. 10*—Continued

| Conductor | Explanation |
|---|---|
| M | Conductor 16 is determined by conductors 25 and 26. |
| N | Conductor 26 is fixed by what conductor 16 was nine digits earlier. |
| O | Conductors 32 and 33 are determined by conductor 16 and the position of SU3. |
| P | Conductor 17 is determined by conductors 28 and 33. |
| Q | Conductor 15 is the opposite of conductor 17. |
| R | Conductor 19 is determined by conductors 20, 28 and 33. |
| S | Conductor 18 is determined by conductors 15 and 19 and the position of SU2. |
| T | Conductor 9 is the digital sum of conductors 8, 10 and 18. |
| U | Conductor 27 is fixed by what conductor 9 was ten digits earlier. |
| V | Conductor 11 is determined by conductors 2 and 9. |
| W | Conductor 24 is determined by conductors 11 and 23. |

In all discussions above it has been assumed that $x$ is a 2W digit number. This may not be the case in some computers. To convert $x$ into a 2W number it may be delayed W digits, which adds W zeros to it. The delay may be obtained to a tap in DL1. Another expedient could be to take $x$ as a W-digit number and send the first 2W pulse at time W, the second at 3W, etc.

It is to be understood that the above-described arrangements are merely illustrative of the application of the principles of the invention. For instance, simplifications may be effected in the block diagram of Fig. 10 without affecting the functioning of the invention. As an example, conductors 12 and 13 of Fig. 10 carry the same pulse information and one of the delay lines DL12 and DL9 could be eliminated so as to make conductors 12 and 13 in fact the same conductor. For illustrative purposes it is believed helpful to separate the conductors 12 and 13 to perhaps clarify the two functions performed by these conductors. Other changes, modifications and simplifications may be devised by those skilled in the art without departing from the spirit and scope of the invention.

What is claimed is:

1. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends and for forming electrical signals representing digits of successive instant remainders by subtracting said instant subtrahend signals respectively from said number signals and from successive said instant remainder signals where said forming functions are all based upon successive assumed instant digits of 1 for said answer, means for detecting whether said instant remainder signals represent positive or negative remainders, and means responsive to the detection of an instant positive remainder for storing an electrical signal representing an instant digit 1 in said answer storing means and for permitting the above process of forming instant subtrahends and instant remainders to proceed and responsive to the detection of an instant negative remainder for storing an electrical signal representing an instant digit 0 in said answer storing means and for forming from said instant negative remainder signals electrical signals representing an X digit number equal to the proper next instant remainder commensurate with the instant stored answer digit of 0.

2. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends and for forming electrical signals representing digits of succesive instant remainders by subtracting said instant subtrahend signals respectively from said number signals and from succesive said instant remainder signals where said forming functions are all based upon successive assumed instant digits of 1 for said answer, means for detecting whether said instant remainder signals represent positive or negative remainders, means responsive to the detection of an instant positive remainder for storing an electrical signal representing an instant digit 1 in said answer storing means and responsive to the detection of an instant negative remainder for storing an electrical signal representing an instant digit 0 in said answer storing means, and means responsive to the detection of an instant negative remainder for forming from said instant negative remainder signals electrical signals representing an X digit number equal to the proper next instant remainder commensurate with the instant stored answer digit of 0.

3. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends and for forming electrical signals representing digits of successive instant remainders by subtracting said instant subtrahend signals from respectively said number signals and from successive said instant remainder signals where said forming functions are all based upon successive assumed instant digits of 1 for said answer, means for determining whether said instant remainder signals represent positive or negative remainders, means responsive to the detection of an instant positive remainder for storing an electrical signal representing an instant digit 1 in said answer storing means and for permitting the above process of forming instant subtrahends and instant remainders to proceed, and means responsive to the detection of an instant negative remainder for storing an electrical signal representing an instant digit 0 in said answer storing means and for forming from said instant negative remainder signals electrical signals representing an X digit number equal to the proper next instant remainder commensurate with the instant stored answer digit of 0.

4. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends where said forming function is based upon successive assumed instant digits of 1 for said answer, means for forming electrical signals representing digits of successive instant remainders by subtracting said instant subtrahend signals respectively from said number signals and from successive said instant remainder signals, means for detecting whether said remainder signals represent positive or negative remainders, means responsive to the detection of an instant positive remainder for storing an electrical signal representing an instant digit 1 in said answer storing means and responsive to the detection of an instant negative remainder for storing an electrical signal representing an instant digit 0 in said answer storing means, and means responsive to the detection of an instant negative remainder for forming from said instant negative remainder signals electrical signals representing an X digit number equal to the proper next instant remainder commensurate with the instant stored answer digit of 0.

5. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends where said forming function is based upon successive assumed instant digits of 1 for said answer, means for forming electrical signals representing digits of successive instant remainders by subtracting said instant subtrahend signals respectively from said number signals and from successive said intant remainder signals, means for detecting whether said remainder signals represent positive or negative remainders, means responsive to the detection of an instant positive remainder for storing an electrical signal representing an instant digit 1 in said answer storing means and for permitting the above process of forming instant subtrahends and instant remainders to proceed, and means responsive to the detection of an instant negative remainder for storing an electrical signal representing an instant digit 0 in said answer storing means and for forming from said instant negative remainder signals electrical signals representing an X digit number equal to the proper next instant remainder commensurate with the instant stored answer digit of 0.

6. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends and for forming electrical signals representing digits of successive instant remainders by subtracting said instant subtrahend signals respectively from said number signals and from successive said instant remainder signals where said forming functions are all based upon successive assumed digits of 1 for said answer, each instant subtrahend being of fixed signal content depending upon the significance of the associated assumed instant digit in said answer, means for detecting whether said instant remainder signals represent positive or negative remainders, means responsive to the detection of an instant positive remainder for storing an electrical signal representing an instant digit 1 in said answer storing means and responsive to the detection of an instant negative remainder for storing an electrical signal representing an instant digit 0 in said answer storing means, and means responsive to the detection of an instant negative remainder for forming from said instant negative remainder signals electrical signals representing an X digit number equal to the proper next instant remainder by adding to said instant negative remainder signals electrical signals representing a special set of digits where the digit content of said set is determined by the instant associated significant digit of 0 in said answer.

7. In a binary digital computer, a square rooter for extracting the square root of a number represented by X binary digits and comprising means for receiving electrical signals representing the digits of said number, means for storing electrical signals representing the digits of the square root of said number as the answer, means for forming electrical signals representing digits of successive instant subtrahends where said forming function is based upon successive assumed instant digits of 1 for said answer, each instant subtrahend being of fixed signal content depending upon the significance of the associated assumed instant digit in said answer, means for forming electrical signals representing digits of successive instant remainders by subtracting said instant subtrahend signals respectively from said number signals and from successive said instant remainder signals, means for detecting whether said instant remainder signals represent positive or negative remainders, means responsive to the detection of an instant positive remainder for storing an electrical signal representing an instant digit 1 in said answer storing means and responsive to the detection of an instant negative remainder for storing an electrical signal representing an instant digit 0 in said answer storing means, and means responsive to the detection of an instant negative remainder for forming from said instant negative remainder signals electrical signals representing an X digit number equal to the proper next instant remainder by adding to said instant negative remainder signals electrical signals representing a special set of digits where the digit content of said set is determined by the instant associated significant digit 0 in said answer.

8. In a binary digital computer, a square rooter for extracting the square root of a number represented by X binary digits and comprising means for receiving electrical signals representing the digits of said number, means for storing electrical signals representing the digits of the square root of said number as the answer, means for forming successive instant series of electrical signals representing successive instant series of X digits where said forming function is based upon successive assumed instant digits of 1 for said answer, means for subtracting the first instant signal series from said number signals and for storing electrical signals representing digits of the instant remainder and for subtracting successive instant signal series from preceding instant remainder signals and for storing electrical signals representing digits of successive instant remainders, means for detecting whether said instant remainder signals represent positive or negative remainders, means responsive to the detection of an instant positive remainder for storing an electrical signal representing an instant digit 1 in said answer storing means and responsive to the detection of an instant negative remainder for storing an electrical signal representing an instant digit 0 in said answer storing means, and means responsive to the detection of an instant negative remainder for forming from said instant negative remainder signals electrical signals representing an X digit number equal to the proper next instant remainder commensurate with the instant registered answer digit of 0.

9. In a binary digital computer, a square rooter for extracting the square root of a number represented by X binary digits and comprising means for receiving electrical signals representing the digits of said number, means for storing electrical signals representing the digits of the square root of said number as the answer, means for forming successive instant series of electrical signals representing successive instant series of X digits where said forming function is based upon successive assumed instant digits of 1 for said answer, means for converting each instant signal series into electrical signals representing its two's complement, means for adding the first instant series' two's complement signals to said number signals and for registering electrical signals representing the instant sum and for adding successive instant series' two's complement signals to preceding signal sums and for registering electrical signals representing successive instant sums, means for detecting whether said instant signal sums are positive or negative, means responsive to the detection of an instant positive sum for storing an electrical signal representing an instant digit 1 in said answer storing means and responsive to the detection of an instant negative sum for storing an electrical signal representing an instant digit 0 in said answer storing means, and means responsive to the detection of an instant negative signal sum for forming from said instant negative signal sum electrical signals representing an X digit number equal to the proper next instant sum commensurate with the instant registered answer digit of 0.

10. In a binary digital computer, a square rooter for extracting the square root of a number represented by X binary digits and comprising means for receiving electrical signals representing the digits of said number, means for storing electrical signals representing the digits of the square root of said number as the answer, dual condition means arranged when in its first condition to form successive instant series of electrical signals representing successive instant series of X digits where said forming function is based upon successive assumed instant digits of 1 for said answer and arranged when in its second condition to form a special instant set of electrical signals representing a special instant variable set of X digits where said latter forming function is based upon a digit of 0 for said answer, means operative when said dual condition means is in its first condition for converting each instant signal series into electrical signals representing its two's complement, means for adding the first instant series' two's complement signals to said number signals and for registering electrical signals representing the instant sum and for adding successive instant series' two's complement signals to preceding signal sums and for registering electrical signals representing successive instant sums, means for detecting whether said instant signal sums are positive or negative, means responsive to the detection of an instant positive sum for setting said dual condition means into its first condition and for storing an electrical signal representing an instant digit 1 in said answer storing means and responsive to the detection of an instant negative sum for setting said dual condition means into its second condition and for storing an electrical signal representing an instant digit 0 in said answer storing means, and means including said dual condition means responsive to the detection of an instant negative sum for forming from said instant negative signal sum electrical signals representing an X digit number equal to the proper next instant sum by adding to said instant negative signal sum the said special instant signal set of X digits.

11. In a binary digital computer, a square rooter for extracting the square root of a number represented by X binary digits and comprising means for receiving electrical signals representing the digits of said number, means for storing electrical signals representing the digits of the square root of said number as the answer, a two-position switch, means operative when said switch is in its first position to form successive instant series of electrical signals representing successive instant series of X instant digits where said forming function is based upon successive assumed digits of 1 for said answer, means operative when said switch is in its second position to form a special instant set of electrical signals representing a special instant variable set of X digits where said latter forming function is based upon a digit of 0 for said answer, means operative when said switch is in its first position for converting each instant signal series into electrical signals representing its two's complement, means for adding the first instant series' two's complement signals to said number signals and for registering electrical signals representing the instant sum and for adding successive instant series' two's complement signals to preceding signal sums and for registering electrical signals representing successive instant sums, means for detecting whether said instant signal sums are positive or negative, means responsive to the detection of an instant positive sum for setting said switch into its first position and for storing an electrical signal representing an instant digit 1 in said answer storing means and responsive to the detection of an instant negative sum for setting said switch into its second position and for storing an electrical signal representing an instant digit 0 in said answer storing means, and means including said switch responsive to the detection of an instant negative sum for forming from said instant negative signal sum electrical signals representing an X digit number equal to the proper next instant sum by adding to said instant negative signal sum the said special instant signal set of X digits.

12. In a binary digital computer, a square rooter for extracting the square root of a number represented by X binary digits and comprising means for receiving electrical signals representing the digits of said number, means for storing electrical signals representing the digits of the square root of said number as the answer, means for forming successive instant series of electrical signals representing successive instant series of X digits where said forming function is based upon successive associated assumed instant digits of 1 for said answer, each instant signal series being of fixed signal content depending upon the significance of the associated assumed instant digit in said answer, means for subtracting the first instant signal series associated with the most significant assumed instant digit of said answer from said number signals and for storing electrical signals representing the instant remainder and for subtracting successive instant signal series associated with successive significant assumed instant digits of said answer from said preceding remainder signals and for storing electrical signals representing successive instant remainders, means for detecting whether said instant remainder signals represent positive or negative remainders, means responsive to the detection of an instant positive remainder for storing an electrical signal representing an instant associated significant digit 1 in said answer storing means and responsive to the detection of an instant negative remainder for storing an electrical signal representing an instant associated significant digit 0 in said answer storing means, and means responsive to the detection of an instant negative remainder for forming from said instant negative remainder signals electrical signals representing an X digit number equal to the next instant remainder commensurate with the instant registered associated significant digit of 0.

13. In a binary digital computer, a square rooter for extracting the square root of a number represented by X binary digits and comprising means for receiving electrical signals representing the digits of said number, means for storing electrical signals representing the digits of the square root of said number as the answer, means for forming successive instant series of electrical signals representing successive instant series of X digits where said forming function is based upon successive associated assumed instant digits of 1 for said answer, each instant signal series being of fixed signal content depending upon the significance of the associated assumed instant digit in said answer, means for converting each instant signal series into electrical signals representing its two's complement, means for adding the first instant series' two's complement signals associated with the most significant assumed instant digit of said answer to said number signals and for registering electrical signals representing the instant sum and for adding successive instant series' two's complement signals associated with successive significant assumed instant digits of said answer to preceding signal sums and for registering electrical signals representing successive instant sums, means for detecting whether said instant signal sums are positive or negative, means responsive to the detection of an instant positive sum for storing an electrical signal representing an instant associated significant digit 1 in said answer storing means and responsive to the detection of an instant negative sum for storing an electrical signal representing an instant associated significant digit 0 in said answer storing means, and means responsive to the detection of an instant negative sum for forming from said instant negative signal sum electrical signals representing an X digit number equal to the proper next instant sum commensurate with the instant registered associated significant answer digit of 0.

14. In a binary digital computer, a square rooter for extracting the square root of a number represented by X binary digits and comprising means for receiving electrical signals representing the digits of said number, means for storing electrical signals representing the digits of the square root of said number as the answer, dual condition means arranged when in its first condition to form successive instant series of electrical signals representing successive instant series of X digits where said forming function is based upon successive associated assumed instant digits of 1 for said answer and arranged when in its second condition to form a special instant set of electrical signals representing a special instant variable set of X digits where said latter forming function is based upon an associated assumed instant digit of 0 for said answer, each instant signal series being of fixed signal content depending upon the significance of the associated assumed instant digit in said answer, means operative when said dual condition means is in its first condition for converting each instant signal series into electrical signals representing its two's complement, means for adding the first instant series' two's complement signals associated with the most significant assumed instant digit of said answer to said number signals and for registering electrical signals representing the instant sum and for adding successive instant series' two's complement signals associated with successive significant assumed instant digits of said answer to preceding signal sums and for registering electrical signals representing successive instant sums, means for detecting whether said instant signal sums are positive or negative, means responsive to the detection of an instant positive sum for setting said dual condition means into its first condition and for storing an electrical signal representing an instant associated significant digit 1 in said answer storing means and responsive to the detection of an instant negative sum for setting said dual condition means into its second condition and for storing an electrical signal representing an instant associated significant digit 0 in said answer storing means, and means including said dual condition means responsive to the detection of an instant negative sum for forming from said instant negative signal sum electrical signals representing an X digit number equal to the proper next instant sum by adding to said instant negative signal sum the said special instant signal set of X digits associated with the instant significant digit 0.

15. In a binary digital computer, a square rooter for extracting the square root of a number represented by X binary digits and comprising means for receiving electrical signals representing the digits of said number, means for storing electrical signals representing the digits of the square root of said number as the answer, a two-position switch, means operative when said switch is in its first position to form successive instant series of electrical signals representing successive instant series of X digits where said forming function is based upon successive associated assumed instant digits of 1 for said answer, each instant signal series being of fixed signal content depending upon the significance of the associated assumed instant digit in said answer, means operative when said switch is in its second position to form a special instant set of electrical signals representing a special variable instant set of X digits where said latter forming function is based upon an associated significant instant digit of 0 for said answer, means operative when said switch is in its first condition for converting each instant signal series into electrical signals representing its two's complement, means for adding the first instant series' two's complement signals associated with the most significant assumed instant digit of said answer to said number signals and for registering electrical signals representing the instant sum and for adding successive instant series' two's complement signals associated with successive significant assumed instant digits of said answer to preceding signal sums and for registering electrical signals representing successive instant sums, means for detecting whether said instant signal sums are positive or negative, means responsive to the detection of an instant positive sum for setting said switch into its first position and for storing an electrical signal representing an instant associated significant digit 1 in said answer storing means and responsive to the detection of an instant negative sum for setting said switch into its second position and for storing an electrical signal representing an instant associated significant digit 0 in said answer storing means, and means including said switch responsive to the detection of an instant negative sum for forming from said instant negative signal sum electrical signals representing an X digit number equal to the proper next instant sum by adding to said instant negative signal sum the said special instant signal set of X digits associated with the instant significant digit 0 in said answer.

16. The invention defined in claim 15 wherein said answer is a W order binary number and wherein X represents a 2W order binary number.

References Cited in the file of this patent

UNITED STATES PATENTS

| | | |
|---|---|---|
| 2,318,591 | Couffignal | May 11, 1943 |
| 2,394,924 | Luhn | Feb. 12, 1946 |
| 2,493,862 | Durfee | Jan. 10, 1950 |
| 2,502,360 | Williams | Mar. 28, 1950 |